US010838605B2

(12) United States Patent
Noel et al.

(10) Patent No.: US 10,838,605 B2
(45) Date of Patent: *Nov. 17, 2020

(54) REACTIVE GRAPHICAL DISPLAY OF REAL-TIME VALUES

(71) Applicant: Splunk Inc., San Francisco, CA (US)

(72) Inventors: Cary Noel, San Francisco, CA (US); Ian Link, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,017

(22) Filed: Oct. 31, 2019

(65) Prior Publication Data

US 2020/0057554 A1 Feb. 20, 2020

Related U.S. Application Data

(63) Continuation of application No. 15/885,799, filed on Jan. 31, 2018, now Pat. No. 10,509,555, which is a continuation of application No. 14/265,854, filed on Apr. 30, 2014, now Pat. No. 9,921,732.

(60) Provisional application No. 61/860,764, filed on Jul. 31, 2013.

(51) Int. Cl.
*G06F 3/048* (2013.01)
*G06F 3/0484* (2013.01)
*G06F 16/00* (2019.01)
*G06Q 10/06* (2012.01)

(52) U.S. Cl.
CPC .......... *G06F 3/04847* (2013.01); *G06F 16/00* (2019.01); *G06Q 10/063* (2013.01)

(58) Field of Classification Search
CPC ........ G06F 3/0484; G06F 17/30; G06Q 10/10
See application file for complete search history.

(56) References Cited

U.S. PATENT DOCUMENTS

| 6,343,508 | B1 | 2/2002 | Feller |
| 7,692,653 | B1 | 4/2010 | Petro et al. |
| 7,957,932 | B1 | 6/2011 | Antanies |
| 8,350,856 | B1 | 1/2013 | Nazir et al. |

(Continued)

OTHER PUBLICATIONS

United States Patent and Trademark Office, U.S. Appl. No. 14/265,854, Advisory Action dated Feb. 15, 2017.

(Continued)

*Primary Examiner* — Mahelet Shiberou
(74) *Attorney, Agent, or Firm* — Perkins Coie LLP

(57) ABSTRACT

Data values for various items are visualized in real-time or near real-time using radial-based techniques to produce data visualizations bearing some resemblance to, for example, pie charts, radial charts, etc. The data values are shown using indicators that encircle, or at least partially encircle, a central point. One or more characteristics of the indicator reflect the value that corresponds to the indicator. The characteristics may include, for instance, the color of the indicator and/or the distance of the indicator (or more specifically, a given point on the indicator) from the central point. The characteristics of the indicators change over time, in accordance with changes in the current values of the data items. A variety of indicators may be used, including, without limitation, points, icons, pie "wedges," filled or partially-filled sectors of an ellipse or semi-circle, arcs or lines that span between the sides of such sectors, and so forth.

20 Claims, 22 Drawing Sheets

(56) References Cited

U.S. PATENT DOCUMENTS

| | | |
|---|---|---|
| 8,610,718 B2 | 12/2013 | Suntinger et al. |
| 8,684,929 B2 | 4/2014 | Heaton |
| 9,921,732 B2 | 3/2018 | Noel et al. |
| 2002/0161853 A1 | 10/2002 | Burak et al. |
| 2004/0085317 A1 | 5/2004 | Malik et al. |
| 2008/0168376 A1 | 7/2008 | Tien et al. |
| 2008/0208027 A1 | 8/2008 | Heaton |
| 2009/0287814 A1 | 11/2009 | Robertson et al. |
| 2013/0263019 A1 | 10/2013 | Castellanos et al. |
| 2014/0354648 A1 | 12/2014 | Bak et al. |
| 2015/0040052 A1 | 2/2015 | Noel et al. |
| 2018/0157404 A1 | 6/2018 | Noel et al. |

OTHER PUBLICATIONS

United States Patent and Trademark Office, U.S. Appl. No. 14/265,854, Final Office Action dated Dec. 16, 2016.
United States Patent and Trademark Office, U.S. Appl. No. 14/265,854, Final Office Action dated Oct. 12, 2017.
United States Patent and Trademark Office, U.S. Appl. No. 14/265,854, Non-Final Office Action dated Jun. 17, 2016.
United States Patent and Trademark Office, U.S. Appl. No. 14/265,854, Non-Final Office Action dated May 8, 2017.
United States Patent and Trademark Office, U.S. Appl. No. 14/265,854, Notice of Allowance dated Jan. 16, 2018.
United States Patent and Trademark Office, U.S. Appl. No. 15/885,799, Non-Final Office Action dated May 8, 2019.

Original search: 1601
search "error" | stats count BY host

Sent to peers: 1602
search "error" | prestats count BY host

Executed by search head: 1603
Merge the prestats results received from peers (reduce)

REACTIVE GRAPHICAL DISPLAY OF REAL-TIME VALUES

CROSS-REFERENCE TO RELATED APPLICATIONS

This application claims the benefit as a Continuation of U.S. application Ser. No. 15/885,799, filed Jan. 31, 2018, which is a Continuation of U.S. application Ser. No. 14/265,854, filed Apr. 30, 2014, now U.S. Pat. No. 9,921,732, issued Mar. 20, 2018, which claims the benefit of U.S. Provisional Application No. 61/860,764, filed Jul. 31, 2013, the entire contents of the foregoing are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to data visualization techniques.

BACKGROUND

Metrics, measures, statistics, and other items of data may be visualized using a variety of techniques that assist an analyst in recognizing and/or understanding characteristics of organizations, systems, and any other entity for which data may be gathered. For example, various aspects of the operation of computer systems may be monitored to increase reliability, reduce security breaches, and anticipate possible operational issues. For instance, web logs generated by a web server providing access to a web site may be monitored to identify the Internet protocol ("IP") addresses of computers accessing the web site. In another example, operating characteristics, such as central processor unit ("CPU") and memory usage, may be monitored to understand the performance and use of a computer system.

Data items often change over time. For example, many operational characteristics of computing systems change over time. For instance, CPU usage may increase or decrease continually based on the type and number of processes being executed by the CPU. In a similar manner, memory usage also typically varies continually based upon the particular processes being handled by the CPU at any given time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 16 illustrates an example of a search query received from a client that the search head can split into two parts, according to an embodiment.

DETAILED DESCRIPTION

Figure 1:
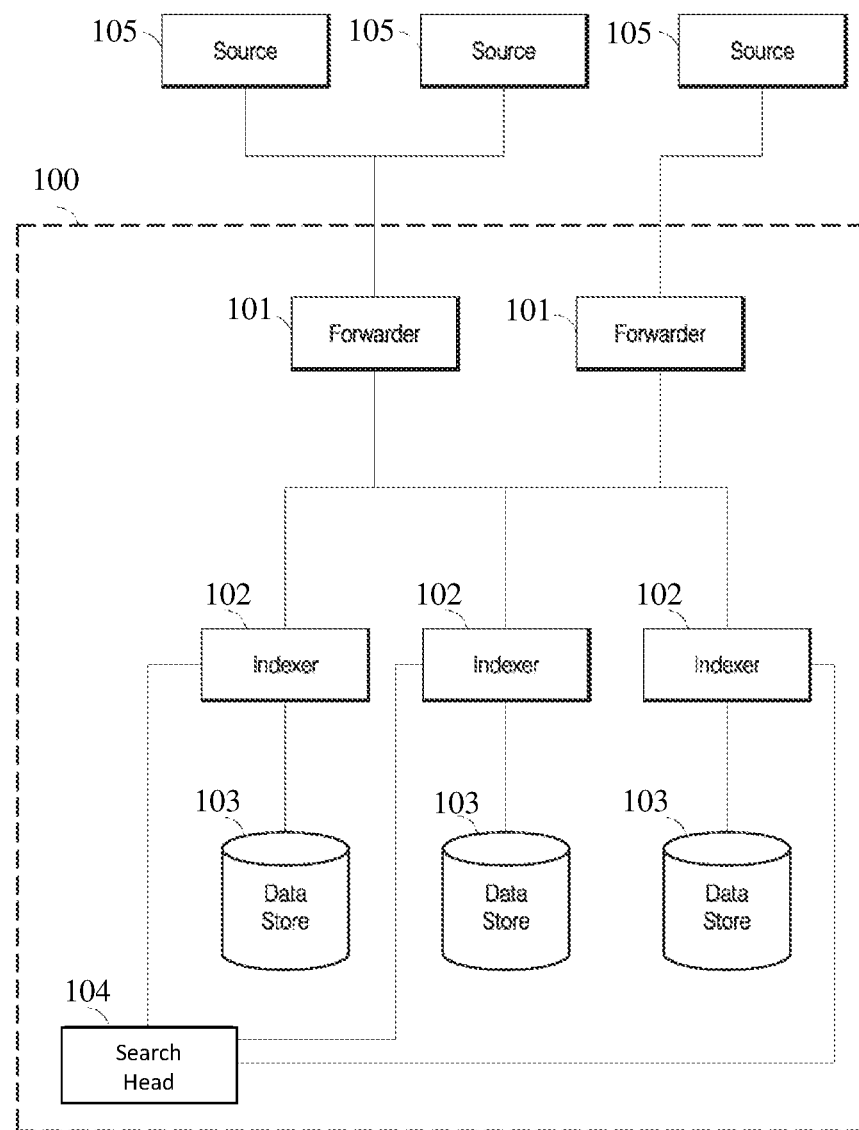
FIG. 1 illustrates an example a block diagram of a data intake and query system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0. General Overview
   2.0. Functional Overview
      2.1. High-Level Process Flow
      2.2. Generating a Visualization
      2.3. Defining Thresholds
      2.4. Peak Indicators
   3.0. Example Visualizations and Interfaces
   4.0. Example Data Retrieval Process Flows
   5.0. Example System Architectures
   6.0. Example Embodiments
   7.0. Hardware Overview
   8.0. Extensions and Alternatives

1.0. General Overview

Data values for various items are visualized in real-time or near real-time using radial-based techniques to produce data visualizations bearing some resemblance to, for example, pie charts or radial charts. The data values are shown using indicators that encircle, or at least partially encircle, a central point. One or more visual characteristics of an indicator reflect the value that corresponds to the indicator. The characteristics may include, for instance, the color of the indicator and/or the distance of the indicator (or more specifically, a given point on the indicator) from the central point. The characteristics of the indicators change over time, in accordance with changes in the current values of the data items. A variety of indicators may be used, including, without limitation, points, icons, pie "wedges," filled or partially-filled sectors of an ellipse or semi-circle, arcs or lines that span between the sides of such sectors, and so forth.

According to an embodiment, the radial nature of the described visualization techniques is such that, the further the indicators are from the central point, the more screen space is devoted to indicators, and/or the indicators become less cluttered. Thus, among other effects, the visualization may render it easier for an analyst to quickly spot unusual or outlying values.

In an embodiment, indicators are colored according to user-configurable thresholds. Interface controls for defining such thresholds are described herein. For example, one such interface control sits upon an axis of the radial-based visualization. Threshold indicators may be added, removed, and/or moved to different coordinates along the axis, to redefine the corresponding threshold values, thereby affecting colors of the indicators within the radial-based visualization and/or other aspects of their appearance.

In an embodiment, "peak" indicators may be displayed for each value indicator to indicate the highest (and/or lowest) value the value indicator has shown over a recent period of time. For example, when the distance between a value indicator and the central point shrinks (or grows), a residual peak arc or point may be left behind for a period of time to indicate that the value has recently been higher (or lower). Hence, among other effects, a user who has turned away from the screen may, upon return, quickly identify values that have recently been much higher (or lower) than currently depicted.

In an embodiment, a data visualization for rendering data in real-time or near real-time is provided. The data to be rendered may be retrieved on a periodic basis. Depending on the period of time between when the data is generated at a data source and when the data is retrieved and rendered, the rendering of the data may be performed in "real-time" or approximately real-time, whereby the data visualization is updated at or nearly the same rate that the data is generated. The retrieval results may be rendered in the data visualization to visually highlight certain levels of data over other levels of data.

In one exemplary configuration, substantially real-time data is received, at least one metric from the real-time data is determined, and a radial graph is rendered. In some configurations, the radial graph includes at least one wedge with a narrow point at the center of an imaginary circle. In one implementation, the radius of the at least one wedge corresponds to a value of the at least one metric determined from the substantially real-time data, and the radius of the at least one wedge adjusts to reflect a current value of the at least one metric.

In another exemplary configuration, substantially real-time data may be received and a metric from the substantially real-time data is determined. A radial graph may be rendered. The radial graph may be a circular or semicircular graph having a center. The radial graph may include an indicator rendered in a sector of the radial graph. The indicator may include an origin at the center of the radial graph, a variable radius and a variable arc having the same arc length as an arc of the sector at the variable radius. The variable radius adjusts to reflect a current value of the metric determined from the substantially real-time data. The indicator may be rendered to fill an area defined by the variable radius and the variable arc.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. Functional Overview

Some or all operations of the flows described in this and other sections of this disclosure, and/or substantially equivalent operations, may be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The operations of the flows described herein below as being implemented, at least in part, by one or more computing devices (described below with regard to FIG. 10). One or more of the operations of the flows described herein may alternatively or additionally be implemented, at least in part, by the similar components in either computing device or a similarly configured server computer providing the example operating environment 100 (described below with regard to FIG. 1). However, the flows may be employed by a variety of other devices and systems.

2.1. High-Level Process Flow

Figure 11:
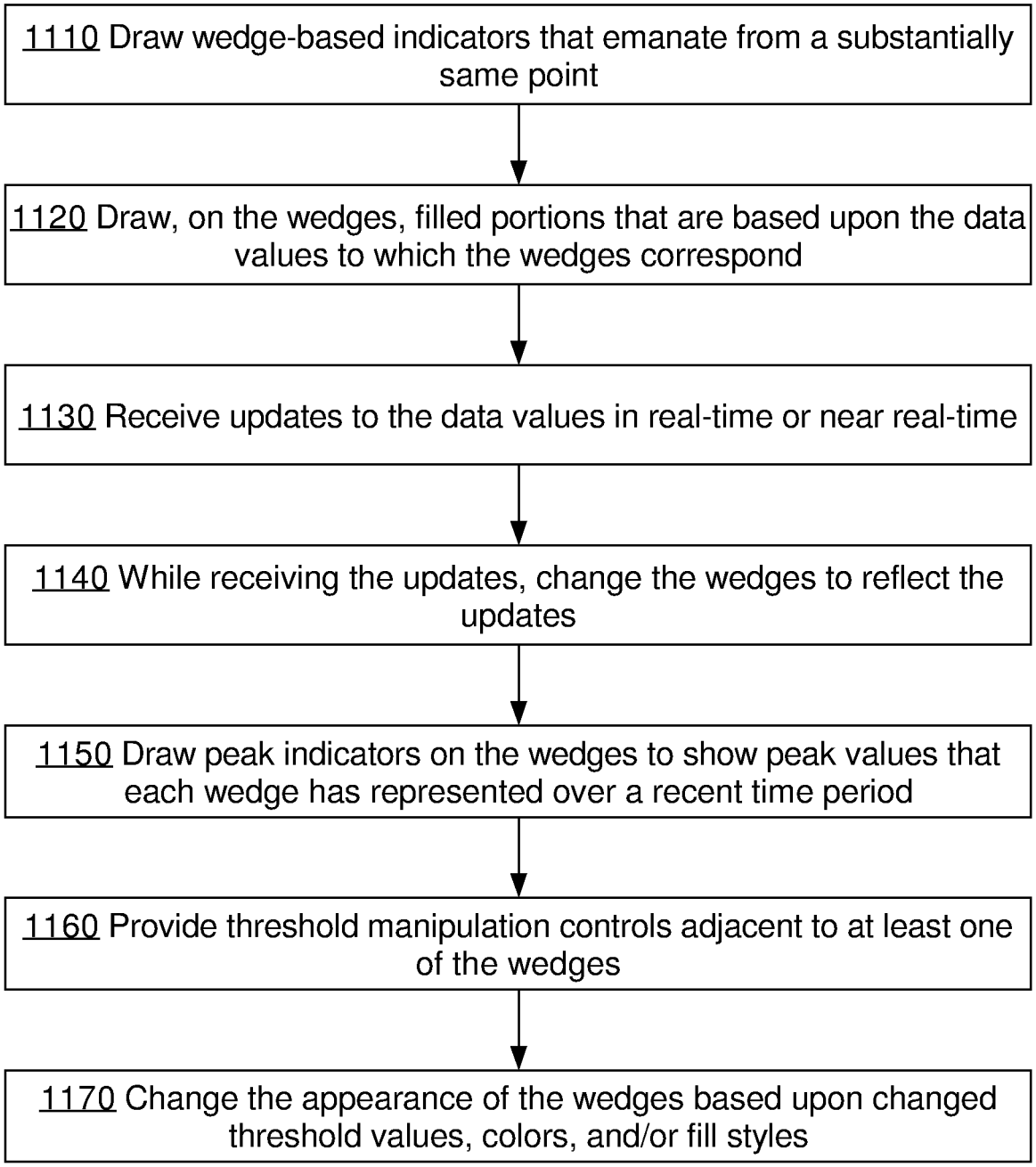
FIG. 11 illustrates another example flow for generating a radial-based data visualization, according to an embodiment.

FIG. 11 illustrates an example flow 1100 for generating a radial-based data visualization, according to an embodiment. Flow 1100 is one example of a method for generating the visualizations described herein. Other methods may involve fewer and/or additional elements, in varying arrangements.

Block 1110 comprises drawing wedge-based indicators that emanate from a substantially same point. Each wedge corresponds to a different data value.

In an embodiment, a "wedge" resembles a "slice" of a pie chart. However, many other types of "wedges" are also possible. As used herein, a "wedge" may more generally refer to a substantially triangular shape, or segment thereof, such as a triangle, a trapezoid, a kite, or a sector of an ellipse or of any other conic section. Each wedge is bounded by two sides that meet at, or may be extended to meet at, a tip. Opposite of the tip, the wedge is bounded by a far edge, such as a line or arc. In an embodiment, the two sides of each wedge in a given visualization will always meet at a same angle. However, in other embodiments, this is not necessarily true.

In an embodiment, when arranged such that each wedge has at least one side that is also the side of another wedge, the group of wedges form a substantially elliptical shape, such as a circle, or a sector of the substantially elliptical shape, such as a semi-circle or quarter circle. Each wedge is itself a sector of the substantially elliptical shape. The substantially elliptical shape need not be exactly maintained when the wedges are depicted. For instance, some or all of the wedges may be spaced from one another such as found in an "exploded" pie chart or in a variety of other radial-based visualization techniques.

In an embodiment, in addition to the wedges, other elements may also be drawn, such as wedge labels, threshold indicators, grid markers, and so forth.

Block 1120 comprises drawing, on the wedges, filled portions whose appearances are based upon the data values to which the wedges correspond. The filled portions are, in essence, indicators that represent the corresponding data values. For instance, the fill color, fill type, and/or size of the filled portion may be determined based on the corresponding data values. In an embodiment, the size of the filled portion, or more specifically the height of the filled portion, is a function of the data value represented by the wedge—for example, the distance from the center point from which the wedge originates to the arc of the wedge corresponds to the data value, and the correspondence could be any of a linear mapping, an exponential mapping, a logarithmic mapping, and so on. The function need not necessarily be a linear function. In an embodiment, the value associated with a wedge is indicated only by the size of the filled portion of that wedge.

In an embodiment, the fill color or style is determined based upon a comparison of the corresponding value to a set of thresholds. Each threshold defines a threshold value and a corresponding color and/or style. When a wedge has a value that surpasses the threshold value, but not a next highest threshold value, the filled portion receives the color and/or style associated with the surpassed threshold value. In an embodiment, the filled portion corresponds to the whole wedge (e.g., the filled portion size is not determined based on the value). In an alternative embodiment, different portions of a wedge have different color depending on the portion being below a threshold, above a threshold, or between two thresholds.

Block 1130 comprises receiving updates to the data values in real-time or near real-time. Example techniques for identifying data values and updates for those values are described in other sections.

Block 1140 comprises, while receiving the updates, changing the wedges to reflect the updates. For instance, the size and/or color of a filled portion of a wedge may change over time, as the values are updated Block 1140 may be repeated any number of times. Hence, for example, in embodiments where the size of a filled portion of a wedge is based upon a data value, the size of the filled portion will grow and/or shrink over time to reflect changes in the corresponding data value.

Block 1150, which is optional, comprises drawing peak indicators (also known as "tracers") on the wedges to show the highest (or lowest) data values that each wedge has represented over a recent time period (for example, it may always be placed at the highest value obtained in the x amount of time). The peak indicator may be, for instance, a thin arc (or dashed arc) spanning the wedge at the location representing the value of the highest value reached in a fixed time period immediately preceding the present moment. Other examples of peak indicators are given in other sections. A peak indicator may move over time, as a previous high value expires and a new high value is determined, or as the highest value reached over the most fixed time period before the present changes. In an embodiment, peak indicators are shown in only certain circumstances, such as when the high value exceeds the currently depicted value by a threshold amount.

Block 1160, which is also optional, comprises providing threshold manipulation controls adjacent to at least one of the wedges. The threshold manipulation controls indicate threshold values represented by the thresholds, and threshold colors and/or fill styles for the thresholds. The threshold manipulation controls are configured to accept inputs that change one or more of the threshold values, colors, and/or fill styles.

Block 1170, which is also optional, comprises changing the appearance of the wedges based upon the changed threshold values, colors, and/or fill styles, in similar manner to block 1120.

2.2. Generating a Visualization

Figure 12:
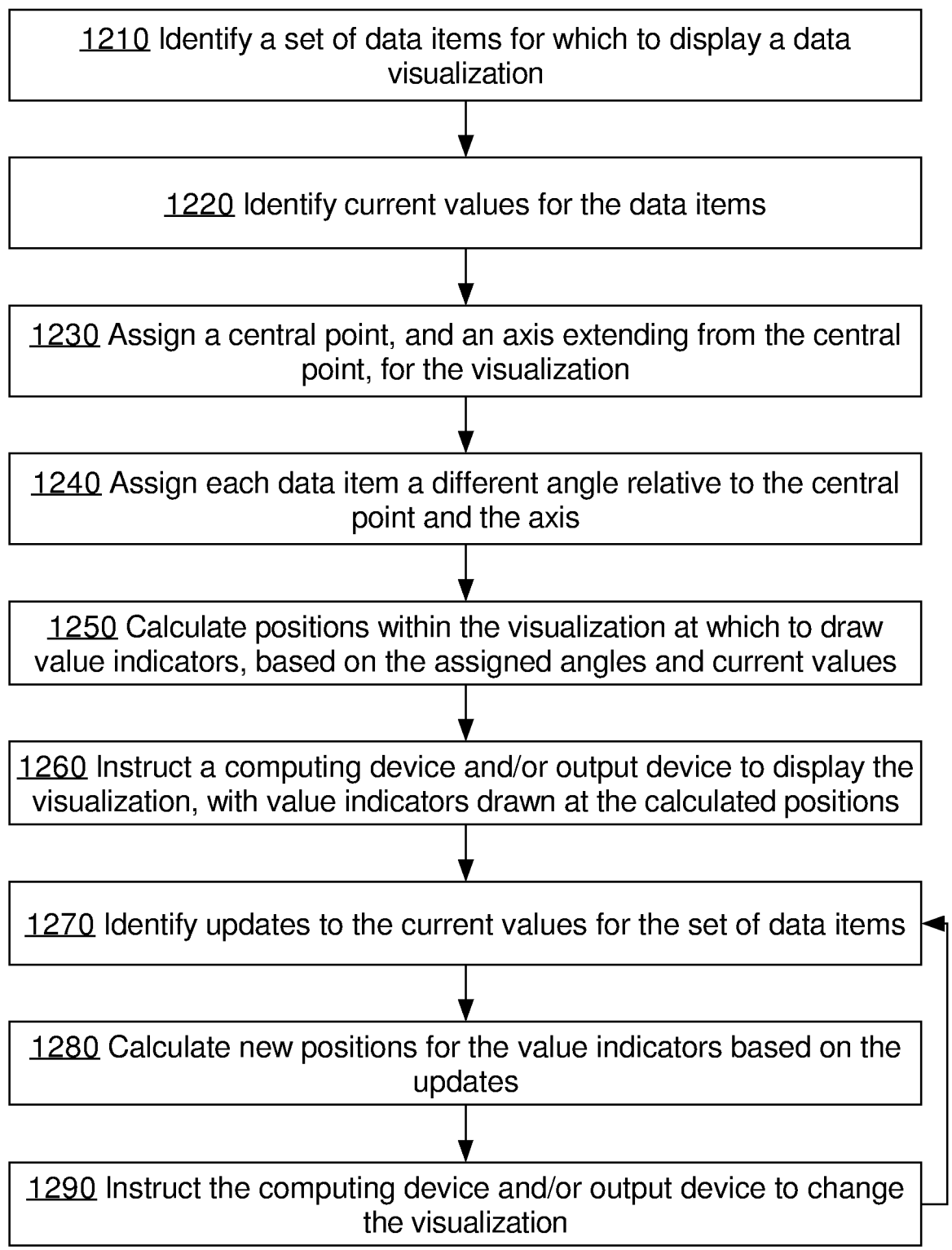
FIG. 12 illustrates another example flow for generating a radial-based data visualization, according to an embodiment.

FIG. 12 illustrates another example flow 1200 for generating a radial-based data visualization, according to an embodiment. Flow 1200 is one example of a method for generating the visualizations described herein. Other methods may involve fewer and/or additional elements, in varying arrangements. In some embodiments, flow 1100 may be implemented, at least partially, using flow 1200. However, flow 1100 is not the only application for flow 1200, nor does flow 1100 necessarily require performance of flow 1200.

Flow 1200 may be performed by a number of different components, depending on the system in which the techniques described herein are implemented. For instance, in an embodiment, flow 1200 is performed by a web application executing on a web server, responsive to requests from web browsers. In another embodiment, flow 1200 may be performed by any suitable server-side component. In yet other embodiments, flow 1200 is performed by a web browser, operating on instructions and/or data provided from a web server. In yet other embodiments, flow 1200 is performed by a client-side application that interfaces with a data server system, or entirely by a standalone client-side application.

Block 1210 comprises identifying a set of data items for which to display a data visualization, such as the example visualizations described in other sections. As used herein, a data item is any defined measure or calculation that produces a value. The identified data items may correspond to any suitable set of measure(s) or calculation(s). For instance, in an embodiment, the data items may correspond to values of a common metric that have been calculated for different sets of data, such as current operating statistics for different groups of computer systems. The data items need not necessarily each correspond to the same type of metric or statistic—for instance, each data item could be a different type of performance score for a same organization.

The set of data items may be a predefined set, or the set of data items may be selectable via user input. For instance, an interface may provide a user with input controls for selecting predefined groups or categories of data items, and/or input controls for selecting individual data items to include in or filter from the set.

Block 1220 comprises identifying current values for the data items. Identifying values may comprise, for instance, submitting queries or other requests to a data server system and/or performing calculations on results returned from the requests. As another example, identifying values may comprise reading the values from in-memory variables, stored files, or any other suitable structure(s). Such structures may be, for instance, periodically updated by an external component that is responsible for determining the values for the data items.

As another example, identifying values may comprise receiving the values over a communication interface, via push-based and/or pull-based communication protocols. For instance, in an embodiment, block 1220 may be performed by a web browser that receives a JSON-formatted or other suitably formatted data stream, in which the appropriate values are embedded. Or, such a data stream may comprise data from which the values for the data items may be calculated. A web browser may be configured by instructions within a web page that the web browser has loaded from a specified URL to request the data stream from a web server or other suitable source.

In an embodiment, the values quantify real-time or near real-time data for the identified data items. However, the visualization techniques described herein may apply to any types of values, whether or not those values reflect real-time or near real-time data. For convenience, the values currently being visualized within the data visualization are sometimes described herein as being "current" values, without regard to whether the current values actually reflect real-time or near real-time data.

Block 1230 comprises assigning a central point, and axis extending from the central point, for the visualization. The central point and the axis can, but need necessarily, be drawn within the visualization. However, regardless of whether they are depicted, a central point and axis are determined so as to be able to calculate where to draw other aspects of the visualization, such as value indicators.

In an embodiment, the central point and axis form part of an elliptical shape or other conic section on which value indicators will be drawn. For instance, the central point may be the center of a circle, while the axis may be a radius of the circle. The indicators need not necessarily be drawn over an entire circle or ellipse—for instance, the indicators may be drawn over a semi-circle or other portion of a circle. Depending on the embodiment, the exact area over which the indicators may be drawn may be selected based on a variety of considerations, such as layout constraints, a number of data items to depict, user preferences, and so forth. Like the central point and the axis, the elliptical shape or other conic section can, but need necessarily, be drawn within the visualization.

In an embodiment, the central point and axis form a polar coordinate system. The polar coordinate system need not necessarily be linear. For example, logarithmic and/or curvilinear systems may be utilized. In an embodiment, grid markers can, but need necessarily, be drawn within the visualization. Each grid marker, or "gridline," is an arc, curve, or line segment that runs around the visualization at a specified distance from the central point. The grid marker is associated with a grid marker value, and visually indicates the distance from the central point that corresponds to that grid marker value. In an embodiment, some or all of the grid markers may in fact be threshold markers corresponding to threshold values, as described elsewhere in the disclosure. In some embodiments, these threshold values, and by extension the threshold markers, may be user configurable.

Block 1240 comprises assigning each data item in the set of data items to a different angle relative to the central point and the axis. Each data item will be visualized using an indicator of some sort that is placed at the assigned angle relative to the central point and the axis. For instance, one data item may be assigned to an angle of 15°, while another may be assigned to an angle of 45°. In an embodiment, to avoid confusion, each data item is assigned a different angle. However, this need not necessarily be true of all embodiments. For instance, in an embodiment, two or more value indicators may be shown at a same angle for comparative purposes.

In an embodiment, the assignment of an angle occurs as an inherent aspect of assigning each data item to a different sector of a circle, ellipse, or other suitable conic section in which value indicators will be drawn. For instance, one data item may be assigned a sector spanning between 0° to 30° from the axis, while another data item may be assigned a sector spanning between 30° to 60°. The sectors may be chosen to avoid assigning data items to partially overlapping sectors. However, in some embodiments, some data items may be assigned to the same sector. In an embodiment, angles are assigned such that the angles are at the middle of a sector in which an indicator is to be placed.

In an embodiment, the spacing between angles is substantially equal. For instance, in an embodiment, there may be a fixed interval between each assigned angle. The fixed interval may be a function of the number of data items and a total number of degrees across which indicators are to be depicted. For instance, if a semi-circle is used for the visualization, the interval may be 180° divided by the number of indicators. In an embodiment, the interval may correspond to, for example, a sector size to be used for each indicator. In other words, each data item is assigned to an equally sized sector. In another embodiment, a fixed interval or sector size is predefined, without regards to the number of indicators.

In an embodiment, the spacing between angles may vary based on factors such as the importance of a data item or the value within the data item. In an embodiment, certain types of data items may be assigned to sectors that are larger than those assigned to other sectors. For instance, in an embodiment, one type of data item may correspond to a "group" of other types of data items. The group indicator may be assigned to a sector whose size is a function—such as three times—of the sizes assigned to the other types of data items. Sector sizes may be chosen, for example, based on this function and the total number of degrees in the visualization.

Block 1250 comprises calculating positions within the visualization at which to draw value indicators. Each value indicator represents the current value that was identified for a corresponding data item. The position is a function of the assigned angle and the value. For instance, a distance may be calculated for the position as a function of the value. The position of the indicator will be at the calculated distance from the central point, and at the assigned angle relative to the central point and axis. In embodiments where the central point and axis form a polar coordinate system, block 1250 may simply amount to plotting the value and assigned angle within the polar coordinate system.

A variety of types of value indicators may be used. For instance, the indicators may be arcs that span from one side of a sector to another side of the sector at the calculated distance, with the assigned angle from block 1240 crossing the mid-point of the arc. As another example, the indicator may be a filled area bounded by such an arc and either the central point or another arc that spans the same sector (referred to in other parts of this application as a "wedge"). As another example, the indicator may be a line extending from the central point to the calculated position. As another example, the indicator may be a line segment, point, icon, or any other suitable visual representation.

The significance of the calculated position of the value indicator may be relative to the type of indicator being used. For instance, the calculated position may correspond to the mid-point of an icon, if an icon-based indicator is used, or the calculated position may correspond to the mid-point of an arc that bounds a wedge, if a wedge-based indicator is used.

In an embodiment, the position is calculated using a function that is relative to a scale for the visualization. The scale ranges from a lowest (or highest) plotted value to a lowest (or highest) plotted value within the visualization. The function translates the value of a data item into a scaled value that corresponds to the calculated distance for the indicator. In an embodiment, the scale may change as of the result of user input and/or based on the values. For instance, as higher values are received, the scale may grow to accommodate those values. Or, a user may specify to depict only values within a certain range.

Block 1260 comprises instructing a computing device and/or output device to display the visualization, with the value indicators drawn at the calculated positions. The exact steps taken to perform block 1260 will depend on the architecture of the system in which flow 1200 is implemented. For instance, if blocks 1210-1260 are performed by a web server, block 1260 may comprise the web server sending JavaScript, HTML, Flash, SVG, and/or other suitable instructions to a web browser that cause the web browser to render the visualization. As another example, if blocks 1210-1260 are being performed by a client-side application, block 1260 may comprise sending instructions down a graphics pipeline to cause the computing device at which the application is executing to output the visualization. Any suitable technique for causing display of the visualization may be utilized.

In an embodiment, the instructions include instructions for how to draw the value indicators. These instructions may, for instance, select a color, fill type, type of indicator, etc., to use for a certain value. Moreover, the instructions may cause the visualization to include a variety of other elements, such as gridlines, threshold markers, labels, legends, interface controls for collecting inputs, and so forth, as described in other sections. The instructions may further include logic for reacting to certain types of inputs, such as instructions for slightly modifying the visualization as a user hovers over or clicks on a certain indicator (e.g., "exploded" wedges, color changes, pop-up information, drill-down effects, etc.).

Block 1270 comprises identifying updates to the current values for the set of data items, in similar manner to block 1220 above. The updates may include new values for each data item, even if some values have not changed. Or the updates may only include data for data items whose values have changed.

Block 1280 comprises calculating new positions for the value indicators based on the updates, in similar manner to block 1250 above. New positions may be calculated for all value indicators, or only those whose values have been updated.

Block 1290 comprises instructing the computing device and/or output device to change the visualization based on the new positions calculated in block 1280. The instructions may amount to instructions to essentially redraw the entire visualization, per block 1260, or instructions to redraw only those elements that change as a result of the calculations in block 1280.

Blocks 1270-1290 are repeated a number of times over a given period of time. The effect of the repetition of blocks 1270-1290 is such that the value indicators within the visualization appear to move as the updates in block 1270 are received, allowing an analyst to monitor the data items for changing values. The repetition may be performed each time an update in block 1270 is received and/or at defined intervals, such as after a specified number of seconds. There may of course be some lag between the time an update is received and the time the visualization is updated, on account of factors such as network latency and resource utilization.

2.3. Defining Thresholds

Figure 13:
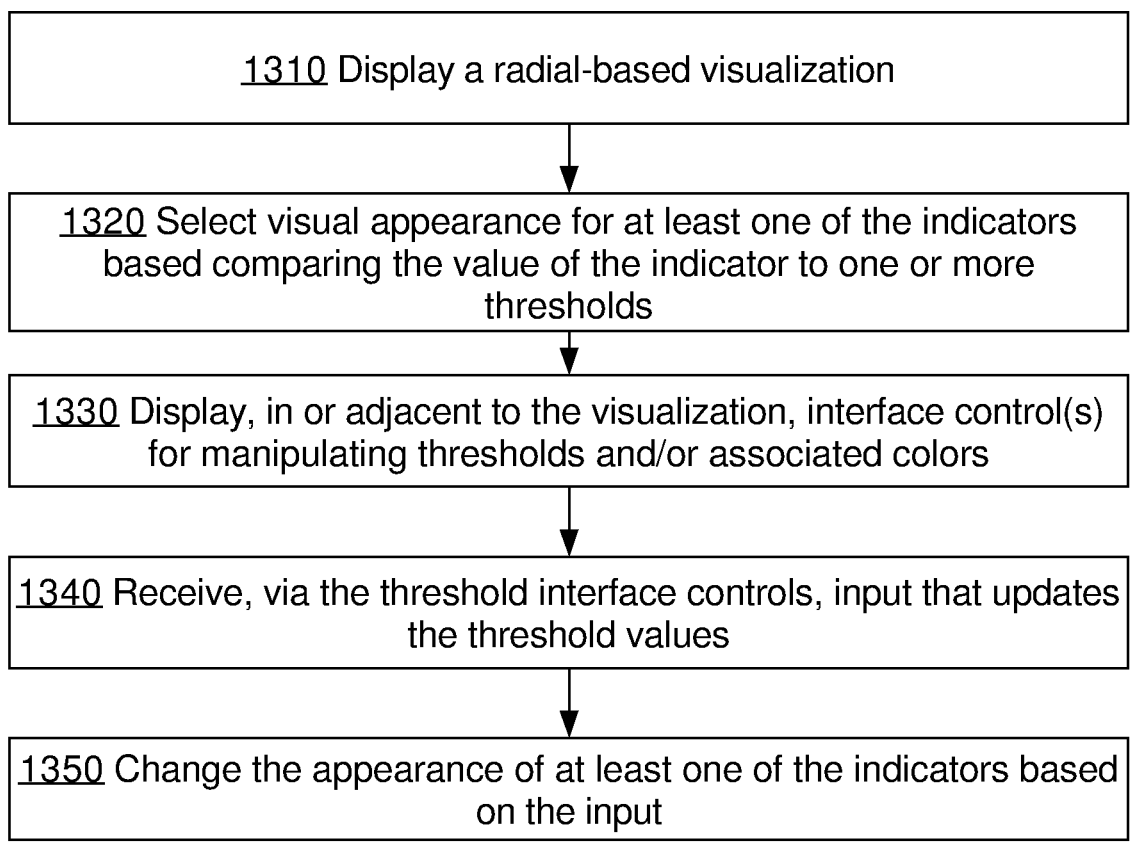
FIG. 13 illustrates an example flow for interactively modifying the appearance of a data visualization to accommodate user-defined thresholds, according to an embodiment.

FIG. 13 illustrates an example flow 1300 for interactively modifying the appearance of a data visualization to accommodate user-defined thresholds, according to an embodiment. As with flow 1200, flow 1300 may be performed by any suitable component within an implementing system. Moreover, flow 1300 can, but need not necessarily, be performed by the same component as flow 1200. For instance, in an embodiment, flow 1200 may be performed by a web server, while flow 1300 is performed at least partially by a web browser operating on instructions from the web server.

Block 1310 comprises instructing a computing device and/or output device to display a radial-based visualization, such as described in other sections of the application. The visualization comprises different value indicators placed at different positions around a central point. The value indicators each represent a different value.

Block 1320 comprises selecting a visual appearance for at least one of the indicators based on comparing the value of the indicator to one or more thresholds. In an embodiment, the one or more thresholds are each associated with a different fill color, fill style, and/or other visual effect. For instance, in an embodiment, if a value is higher than a threshold associated with a green fill color, the indicator may be colored green. As another example, in an embodiment, if a value is lower than a threshold associated with a yellow fill color, the indicator may be colored yellow.

The fill style or color may be used for the indicator itself and/or for a background area behind the indicator. For instance, if the indicator is (or comprises) an arc, then depending on the embodiment, the area under the arc may be drawn in accordance with the applicable threshold, or the entire sector in which the arc appears may be drawn in accordance with the applicable threshold.

In an embodiment, the color of the value indicator may be a function of the value, such that a gradient between two colors associated with two thresholds may be chosen when the value is between those two thresholds. In an embodiment, a default color may be chosen for values that do not surpass (or, in some embodiments, do not fall below) any defined threshold.

Block 1330 comprises instructing a computing device and/or output device to display, in or adjacent to the visualization, one or more interface controls for manipulating the one or more thresholds and/or the associated different colors. Any suitable interface controls may be used, such as check boxes, textual input boxes, buttons, and so forth.

In an embodiment, the threshold interface controls may be sliding indicators depicted along a scale for the visualization. For instance, each threshold may be depicted using a different colored indicator along the scale, and the user may "slide" an indicator to change the threshold value. Other inputs focused on an indicator, such as a right-click or long-press, may bring up interface controls for deleting an indicator, adding another indicator, or changing the appearance associated with an indicator.

In an embodiment, the threshold scale and accompanying sliders are depicted along a radius line segment within the visualization itself, such as along the axis of the visualization. The threshold indicators are positioned at a distance from the central point that corresponds with the distance at which a value indicator having the threshold value would be positioned. For instance, if the visualization conforms to a polar coordinate system, the threshold indicators are essentially plotted within that coordinate system, along the threshold scale line. In an embodiment, threshold markers may extend from the indicators around the central point of the visualization, at the distance corresponding to the threshold value.

In an embodiment, the visualization is at least a sector of an elliptical shape, such as a semi-circle or a three-quarter circle, and the threshold input controls are depicted along the edge of that sector. In an embodiment, the threshold input controls are overlaid partially transparently upon a radius line of the visualization. This may be particularly useful if, for example, the visualization is a full circle that lacks an edge at which to place the threshold input controls, but may also be used in any other embodiment. In an embodiment, the threshold input controls may disappear if a user input mechanism, such as a mouse cursor, is not within a certain vicinity of the threshold input controls.

Block 1340 comprises receiving, via the threshold interface controls, input that updates the one or more threshold values. Block 1350 comprises instructing the computing device and/or output device to change the appearance of at least one of the indicators based on the input from block 1340. Blocks 1340-1350 may be performed concurrently with updates to the values being visualized, as in blocks 1270-1290.

2.4. Peak Indicators

Figure 14:
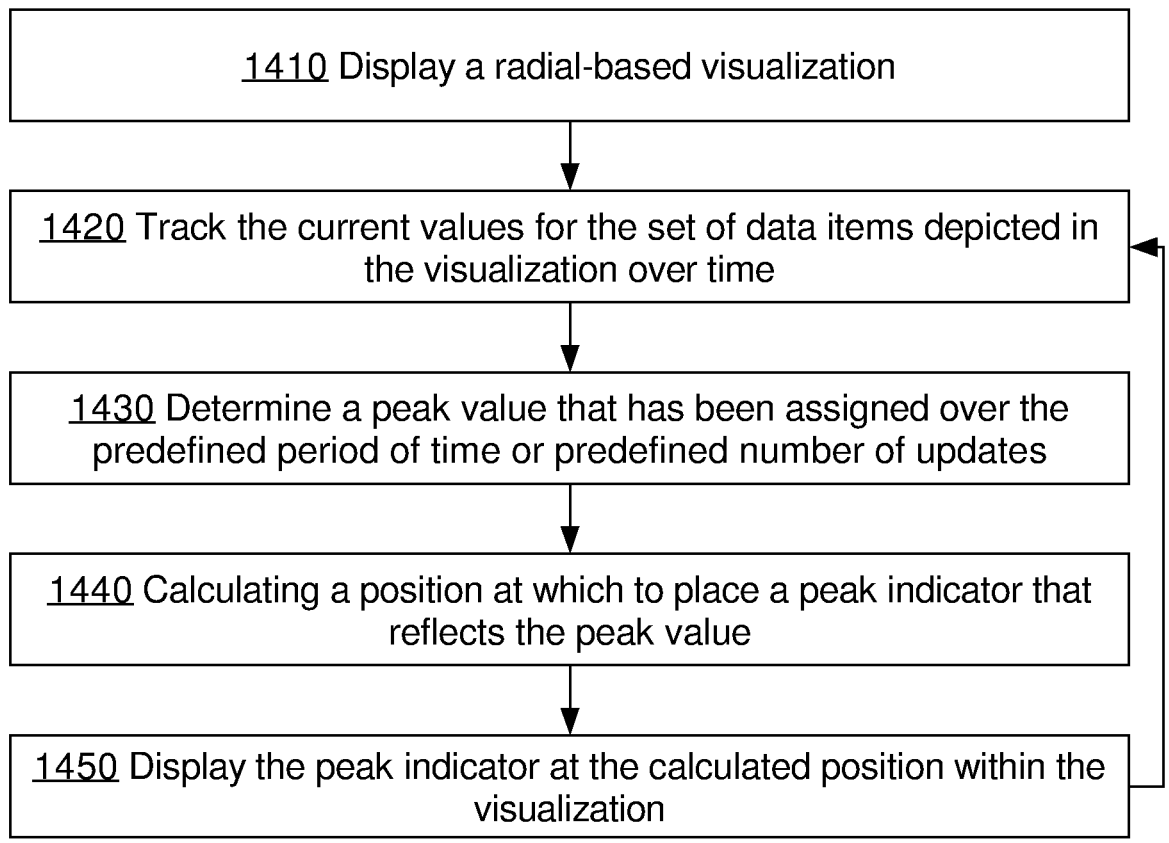
FIG. 14 illustrates an example flow for interactively modifying the appearance of a data visualization to accommodate peak indicators, according to an embodiment.

FIG. 14 illustrates an example flow 1400 for interactively modifying the appearance of a data visualization to accommodate peak indicators, according to an embodiment. As with flow 1200, flow 1400 may be performed by any suitable component within an implementing system. Moreover, flow 1400 can, but need not necessarily, be performed by the same component as flow 1200. For instance, in an embodiment, flow 1200 may be performed by a web server, while flow 1400 is performed at least partially by a web browser operating on instructions from the web server.

Block 1410 comprises instructing a computing device and/or output device to display a radial-based visualization, such as described in block 1310.

Block 1420 comprises tracking the current values for the set of data items depicted in the visualization over time. For example, a log of recent values over at least a predefined period of time or a predefined number of updates may be maintained. Values older than the predefined period of time or number of updates may or may not be discarded, depending on the embodiment.

Block 1430 comprises determining, for at least one of the data items depicted in the visualization, a peak value that has been assigned over the predefined period of time or predefined number of updates. The "peak" value is the highest (and/or lowest, in some embodiments) value that has been assigned to the data item over the predefined period of time or predefined number of updates.

Block 1440 comprises calculating a position at which to place an indicator (referred to herein as a "peak indicator") that reflects the peak value, in similar manner to block 1250. Because a peak indicator may, in some embodiments, be constantly updated to reflect a recently reached max or min value, and thus trails the a current or real-time value, the indicator may in some embodiments also be referred to as a "tracer."

Block 1450 comprises instructing a computing device and/or output device to display the peak indicator at the calculated position within the visualization, in similar manner to block 1260. The peak indicator may be depicted in a variety of manners, such as point, icon, arc, wedge, and so on. The peak indicator may be distinguished in appearance from the visual indicator. For example, the visual indicator may comprise a solid arc, whereas the peak indicator may be a dotted or dashed arc. Or, as another example, the peak indicator may be depicted as partially transparent. Or it may be in a distinguishing color.

In an embodiment, if the peak indicator is at the same position, or within a certain vicinity of the value indicator for a data item, the peak indicator is not depicted. Hence, the peak indicator may only be shown when there is a dramatic difference between a recent value and the current value for a data item.

The peak indicator is especially useful in embodiments where the radial graph components change to represent a stream of values, where the values may momentarily—and imperceptibly—spike. The peak indicator or tracer, because it may hold the maximum value for a more perceptible period of time, helps a human viewer to view and appreciate an otherwise imperceptible spike in the values.

Blocks 1420-1450 may be repeated over time. A new iteration of blocks 1420-1450 may be performed at the same time as the updating of block 1290 occurs, or asynchronously relative to blocks 1270-1290. Block 1440-1450 need not be performed if the peak value has not changed.

As a result of repeating blocks 1420-1450, a peak value depicted by the peak indicator will eventually "expire," in that it is no longer found within the predefined period of time or a predefined number of updates, or in that it is superseded by a new peak value. Thus, the peak indicator will move to reflect a new highest (or lowest) value. In an embodiment, the peak indicator may disappear altogether if the peak value is the same as, or with a certain vicinity to, the current value. In an embodiment, there may not necessarily be a predefined period of time, but rather the amount of time after which a peak indicator expires may be a function of the values that have recently been assigned to a data item. Thus, for example, a peak indicator for an extremely high peak value relative to the average value of a data item may be displayed longer than a peak indicator for a smaller peak value.

In an embodiment, the appearance (e.g., transparency or line width) of a peak indicator may be a function of an amount of time since the peak value occurred. For instance, the peak indicator may gradually "fade" away as the value it reflects is set to expire.

3.0. Example Visualizations and Interfaces

The GUIs and visualizations described in this section are merely examples of suitable GUIs and visualizations for practicing the techniques described herein. The methods described in the previous section may in fact utilize a variety of different types of GUIs other than those described in this section and/or produce many different variations on the example visualizations described herein.

Figure 2:
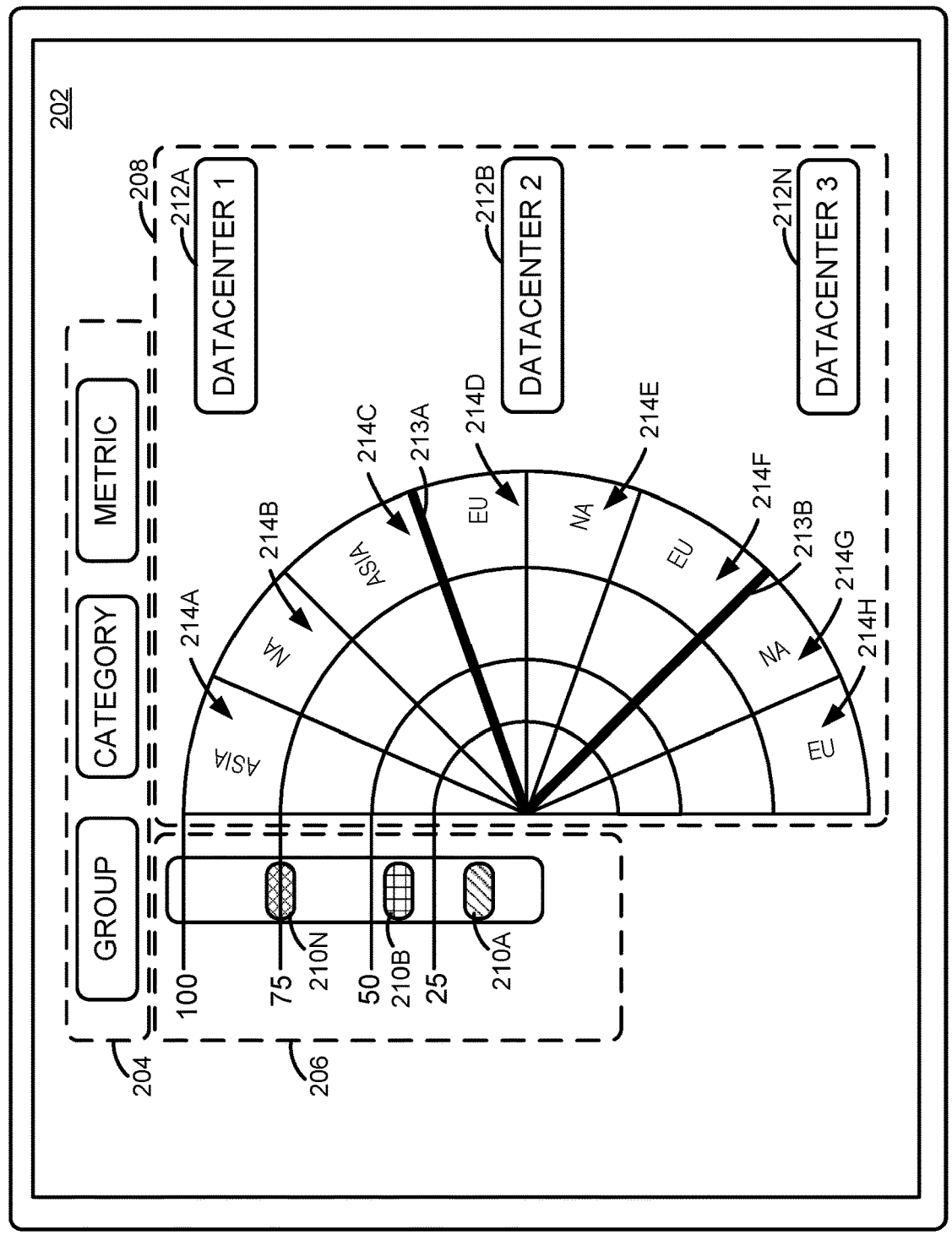
FIG. 2 is a user interface ("UI") diagram that illustrates aspects of a graphic UI ("GUI") for presenting a graphical display of searches performed on unstructured data, according to some embodiments.

FIG. 2 is a UI diagram 200 showing a GUI 202 that provides a visualization of data values for a set of data items, according to an embodiment. The depicted data items may be any suitable set of items for which values are obtainable. For example, in an embodiment, GUI 202 may provide a graphical rending of a data set returned based on a search of one or more of the data sources, as described in other sections.

For illustrative purposes, a number of examples within this disclosure are described in terms of a search performed on unstructured data for purposes of illustrating an example embodiment of the presently disclosed subject matter. But, it should be understood that the present disclosure is not limited to unstructured data sources or that a search be performed. For example, a data source to be represented by a radial graph may be any stream of values or measurements, including sensor readings such as those that may come from a sensor such as a temperature probe that transmits temperature measurements for rendering in the GUI 202. In some configurations, the temperature data may be retrieved and rendered without the need for a search. As additional examples, the data source may be a flat file that is periodically updated by another application, a query on a relational database. These and other configurations are considered to be within the scope of the present disclosure.

Returning to FIG. 2, the GUI 202 may include a metric interface 204, a threshold interface 206, and a data visualization 208 in some embodiments. These parts are delineated by dashed lines around each part. The dashed lines shown in FIG. 2, as well as other dashed lines used herein, may or may not be presented or rendered to a user, as the dashed lines may be used as matter of convenience for purposes of describing the presently disclosed subject matter. Further, the use of these and other dashed lines herein is not meant to connote a functional boundary. Additionally, it should be appreciated that although the data visualization 208 is illustrated as a radial graph, other types of graph may be used and are considered to be within the scope of the present disclosure.

The metric interface 204 shown in FIG. 2 is configured to provide a user, or other entity, with the ability to define the data sources that are to provide the data to be rendered in the data visualization 208, as well as the particular data, or the metrics, for rendering. The metric interface 204 may have one or more selectable controls that receive input from a user or other entity to select, sort, and/or filter the data that is rendered in the data visualization 208. Illustrated are selectable metric interfaces entitled, "GROUP," "CATEGORY," and "METRIC." An exemplary configuration for a selectable metric interface is explained in more detail in FIG. 3D, below.

The threshold interface 206 may be configured to receive an input to change various visual aspects associated with the data visualization 208. For example, the threshold interface 206 may have variable threshold indicators 210A-210N. The variable threshold indicators 210A-210N may be thresholds that are configured to be adjustable by a user or another entity or may be set based on various factors. The threshold interface 206 may be configured to receive an input to establish a number of thresholds, increase the number of thresholds, or decrease the number of thresholds. The presently disclosed subject matter is not limited to any particular manner in which the variable threshold indicators 210A-210N are set or the reason for setting the variable threshold indicators 210A-210N. Further, it should be appreciated that the presently disclosed subject matter is not limited to any number of variable threshold indicators 210A-210N. In some configurations, the threshold interface 206 may be configured to receive an input from a user or other entity to increase or decrease the number of the variable threshold indicators 210A-210N.

The variable threshold indicators 210A-210N may be configured to receive an input from a user to cause the data visualization 208 to render data in a certain fashion when the data is within certain limits delineated by the variable threshold indicators 210A-210N. For example, CPU usage from 0 to the threshold set by the variable threshold indicator 210A may be rendered in the data visualization 208 in the hatched pattern illustrated in the variable threshold indicator 210A. Data above the threshold set by the variable threshold indicator 210A up to the threshold set by the variable threshold indicator 210B may be rendered in the data visualization 208 in the vertical-horizontal cross-hatched pattern illustrated in the variable threshold indicator 210B. In a similar manner, data above the threshold set by the variable threshold indicator 210B up to the threshold set by the variable threshold indicator 210N may be rendered in the data visualization 208 in the diagonal cross-hatched pattern illustrated in the variable threshold indicator 210B. It should be appreciated that the presently disclosed subject matter is not limited to any particular design or color choice for any of the thresholds, as explained in more detail in FIG. 3C, below.

As mentioned above, the GUI 202 may also include the data visualization 208. In the present configuration, the data visualization 208 is a radial graph, where the center of the semi-circle of the data visualization 208 represents a center or "0" level and the outer perimeter of the data visualization 208 represents a "100" level, which may be a percentage or an absolute value depending on the scale of the particular configuration. The data visualization 208 may also show gridline indicators, rendered in the data visualization 208 as arcs in each sector of the radial graph rendered in the data visualization 208, for levels between 0 and 100, such as "75," "50" and "25," though it should be appreciated that more or fewer levels may be used than illustrated in FIG. 2.

Continuing with the example of CPU usage to provide context of the use of levels, a "0" level of CPU usage may indicate that the CPU is not being used and a "100" level may indicate that the CPU is being utilized to its maximum capacity. Depending on the particular metric, the level may indicate different aspects. It should be understood that the presently disclosed subject matter is not limited to the 0-100 scale illustrated in the threshold interface 306, as other types of scales, using various alphanumerical designations, may be used.

Data visualization 208 may be graphically segregated into sectors 214A-214H (hereinafter referred to collectively and/or generically as "the sectors 214"), in which indicators be drawn, according to various embodiments. Each sector corresponds to a different data item, which may be a single data point or a function of a group of data points. For example, as depicted, each sector 214 corresponds to a data item having, as its value, a metric calculated from a subset of data sources indicated by a given category 212. For instance, sector 214A may correspond to a metric for a subset of servers located in Asia that are associated with the data sources indicated by category 212A. Meanwhile, the sector 214H may correspond to a metric for a subset of servers in the European Union associated with data sources indicated by the category 212N.

In an embodiment, the data visualization 208 may optionally be separated into various sets of sectors 214 to show data associated with categories of data items. For example, the data visualization 208 may be graphically segregated into categories 212A-212N (hereinafter referred to collectively and/or generically as "the categories 212"). For instance, the category 212A is associated with one or more data sources from a "DATACENTER 1" category. The category 212B is associated with one or more data sources from a "DATACENTER 2" category. The data center category 212C is associated with one or more data sources from a "DATACENTER 3" category. The categories 212 may be visually separated using various techniques. For example, and not by way of limitation, the category 212A and 212B are separated by a category separator 213A. In a similar manner, the category 212B and 212C are separated by a category separator 213B.

FIG. 2 illustrates only one example GUI 202 for presenting a data visualization 208. In other embodiments, GUI 202 may have additional, fewer, and or different elements, in varying arrangements. For example, in an embodiment one or both of metric interface 204 and threshold interface 206 may be different or altogether omitted. As another example, in an embodiments, there need not necessarily be categories 212 of data items, or there may be multiple hierarchical levels of categories 212.

Figure 3A:
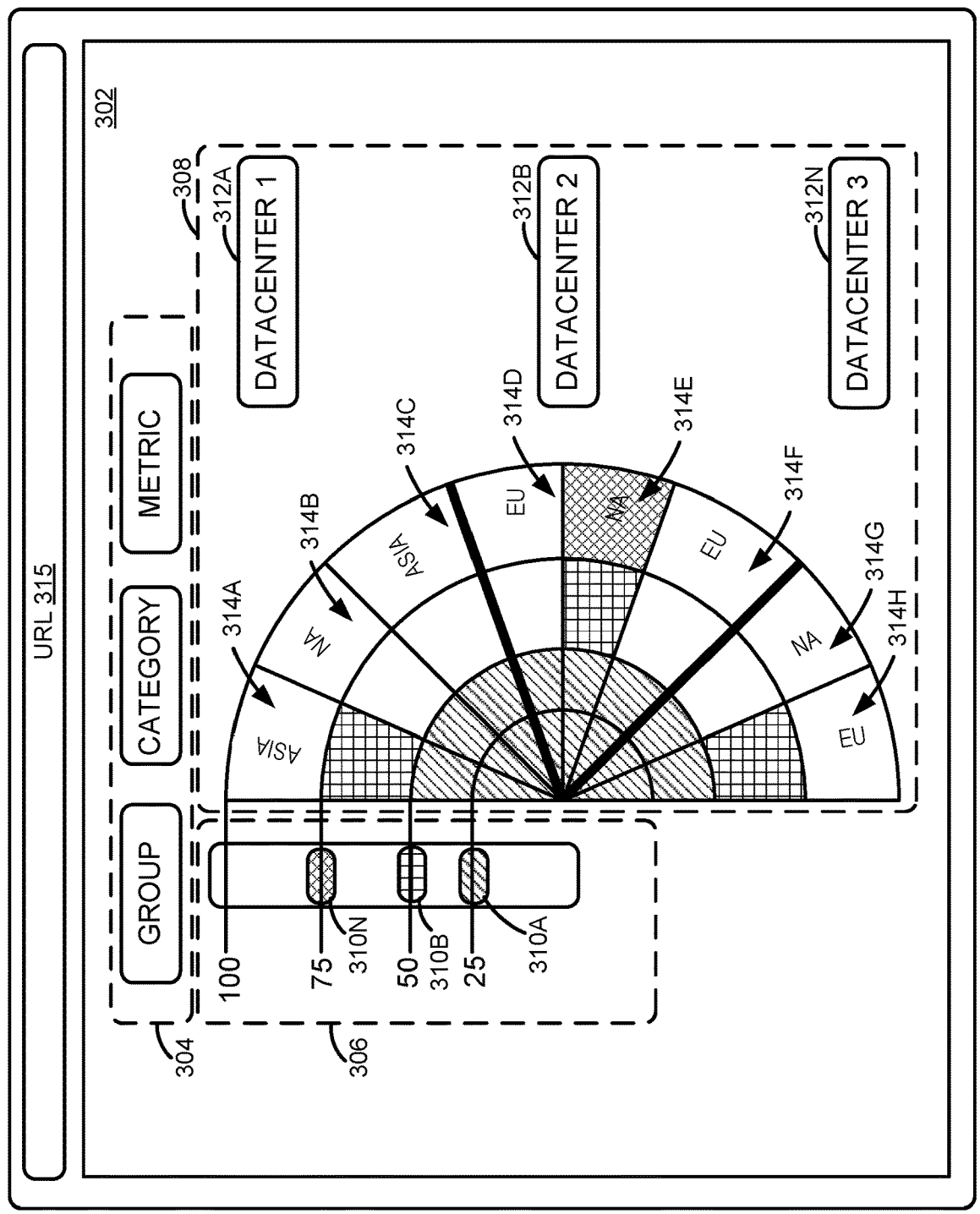
FIGS. 3A-3F are UI diagrams showing exemplary UIs that provide various functionality associated with the rendering of searches performed on unstructured data using data visualizations, according to some embodiments.

FIGS. 3A-3F are illustrative screen shots of UIs that provide various functionality associated with the rendering of searches performed on unstructured data using data visualizations. FIG. 3A is an illustration of a display 300 that has rendered thereon a GUI 302. The GUI 302 depicts a data visualization 308, which is a radial-based graph. The GUI 302 renders data associated with categories 312A-312N (hereinafter referred to collectively and/or generically as "the categories 312"). Each of categories 312 comprises one or more data items 314A-314H (hereinafter referred to collectively and/or generically as "the data items 314"). Values associated the data items 314A-314H are visualized via indicators in different sectors of the radial graph.

As illustrated, each of the data items 314 correspond to different sectors, or "slices," of the data visualization 308. An indicator of the value of a data item 314 is rendered within the sector that corresponds to the data item. The indicator may have a variable radius and an arc spanning the corresponding sector at the variable radius, as illustrated in more detail in FIG. 5, below. An area between the arc and the center point of the radial graph is filled in according to different colors and/or patterns. As depicted, different fill styles or colors are used for different portions of the area underneath the indicator, with each portion corresponding to a different threshold. However, in other embodiments, the entire area underneath an indicator may be filled using a single fill style or color, in accordance with the highest threshold surpassed by the indicator.

As depicted, the categories 312 are "data source categories," each comprising a collection of different data items 314, while data items 314, in turn, correspond to groups of data sources. It should be appreciated that the present disclosure is also not limited to any particular manner of establishing one of the groups or the data source categories, as various techniques may be used. For example, the data source groups or the data source categories may be grouped and categorized based on factors such as geographic location, the type of source, and the like. Moreover, it should be appreciated that the present disclosure may relate to any set of data items For the purpose of illustrating an exemplary configuration, the metric rendered in FIG. 3A is CPU usage, and includes a percentage of CPU resources in use. The data may have been provided in various manners. In one configuration, the data may be provided by a system configured in a manner similar to the operating environment 100, described in other sections. A search client may transmit search instructions to a search engine, on a periodic basis, to retrieve CPU usage data from at least one data source. The search engine may periodically perform a search on a time series data store to retrieve data relating to the search instructions.

During other periodical intervals, which may or may not be the same periodic basis in which a search and retrieval is performed by a search engine, the search client may query the search engine to determine if there is any new data from the most recent search. If there is new data, the search client may request the new data and update the GUI 302 accordingly. If there is no new data, the search client may maintain the current configuration of the GUI 302 or may set new values of information to null, 0 or some other value or indication. In this manner, the data presented in the GUI 302 may be dynamic The indicators associated with data items 314A-314N indicate that all the servers in the groups associated with the visualized data source groups are using at least 50 percent of their CPU resources. This may be ascertained by the fact that all of the indicators have a hatched pattern. The hatch pattern is rendered in this example because the GUI 302 has received an input from a threshold indicator 310A to indicate a hatched pattern from a level of 0 percent to a level of 50 percent.

A threshold indicator 310B has been placed to instruct the data visualization 308 to render CPU usage above 50 percent up to and including 75 percent in a vertical-horizontal cross-hatched pattern. The data items 314A, 314E, and 314H all indicate a CPU usage above 50 percent up to and including 75 percent. A threshold indicator 310N has been placed to instruct the GUI 302 to render CPU usage above 75 percent in a diagonal cross-hatched pattern. The data item 314E indicates a CPU usage above 75 percent.

In an embodiment, various aspects of the presently disclosed subject matter may be provided in a distributed computing environment. In some distributed computing environments, access to services or information may be facilitated through the use of an address, such as a uniform resource locator ("URL"). The presently disclosed subject matter, however, is not limited to a URL, as other address types may be used and are considered to be within the scope of the presently disclosed subject matter.

To access or share the information provided by the GUI 302, a URL address bar 315 may be provided. The URL address bar 315 may be configured to receive an input of a web address. In FIG. 3A, the URL address bar 315 may be used to direct a web browser to a website hosted by a server providing various aspects of the presently disclosed subject matter, including a web page for generating the GUI 302. By directing the web browser to the particular web address, a user may view the GUI 302. In addition, the web address entered into the URL address bar 315 may be shared with another user to allow more than one user to view the GUI 302. The particular web address in the URL address bar 315 may be provided from various sources, including the server providing various aspects of the presently disclosed subject matter. In some configurations, the GUI 302 may be rendered in a graph or dashboard in various visualization applications, such as SPLUNK ENTERPRISE, provided by SPLUNK INC. of San Francisco, Calif.

Figure 3B:
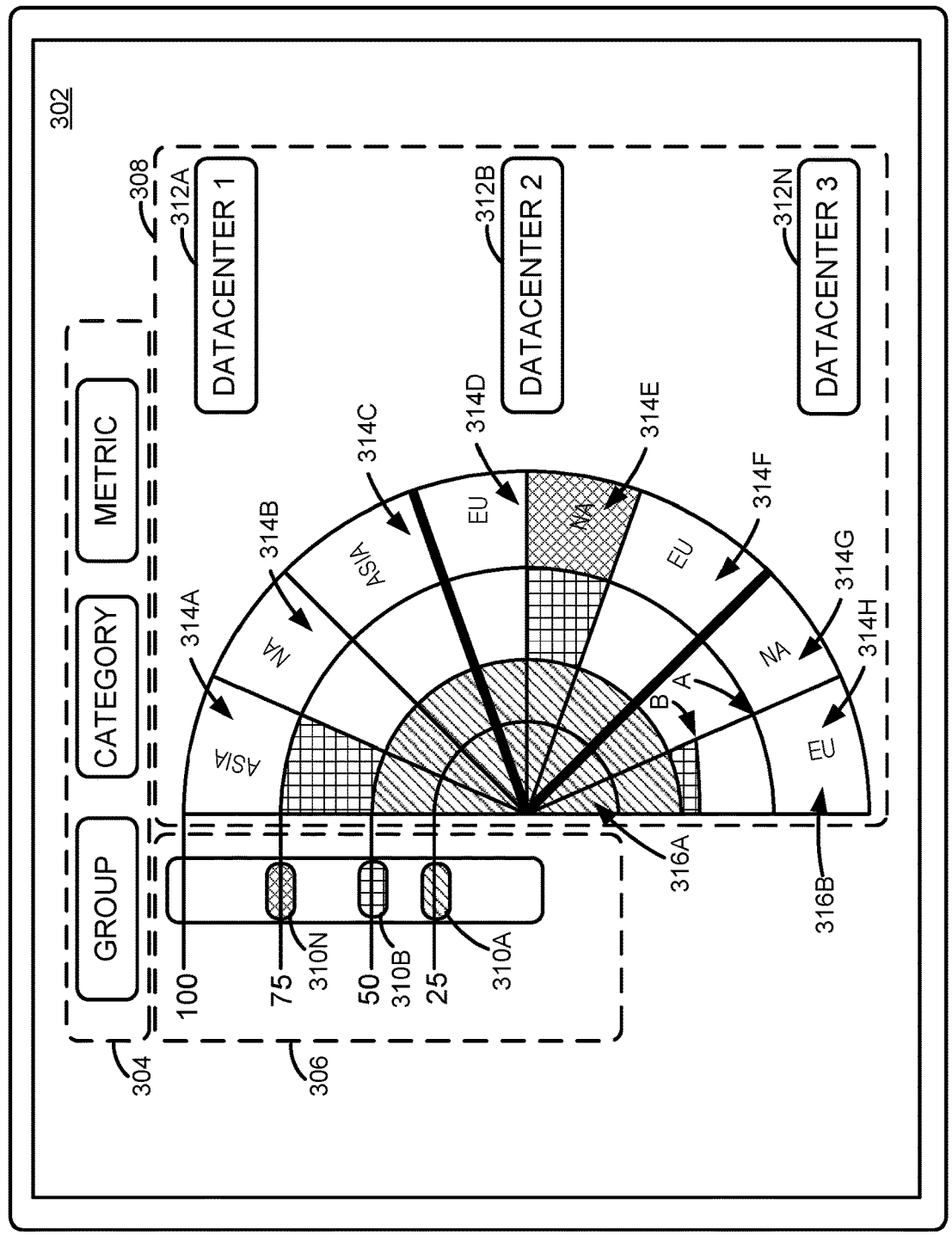

FIG. 3B is a UI diagram showing how changes in data may be rendered in the GUI 302. In FIG. 3B, the value associated with data item 314H has changed from the 75 percent level illustrated in FIG. 3A, indicated by "A," to an interim level illustrated in FIG. 3B, indicated by "B." As shown, the level may vary within the percent levels presented in the threshold interface 206.

Also shown in FIG. 3B is the radial nature of the GUI 302, as a change of data in the levels near the outer perimeter of the data visualization 308 present a relatively larger visual change than the same change in data in the levels near the center of the data visualization 308. For example, in the data item 314H, a level partition 316A of an indicator has a smaller area than a level partition 316B of the same indicator. But, the level partition 316A and the level partition 316B each represent a total of 25 units of CPU usage data. To indicate the same amount of change in the data, because of its greater area, the visual change in the level partition 316B is greater than the visual change in the level partition 316A. Thus, for the same change in data, a different visual change is rendered depending on the level of the data.

It should be understood that, in some configurations, the levels established by the threshold indicators 310A-310N might be changed by moving the threshold indicators 310A-310N within the threshold interface 306. It should also be understood that, in some configurations, the number of the threshold indicators 310A-310N may be changed along with the patterns, colors, or other indicia for each. For example, the GUI 302 may receive an input that indicates that some part of the threshold interface 306 is to be modified. In that example, a threshold modification user interface may be rendered. In some configurations, a user may add new threshold indicators 310 by selecting an appropriate location on the GUI 302. In further configurations, a user may remove one or more of the threshold indicators 310 by selecting the particular threshold indicator and dragging the threshold indicator off the GUI. The presently disclosed subject matter is not limited to any particular technology for adding and removing one or more of the threshold indicators 310.

Figure 3C:
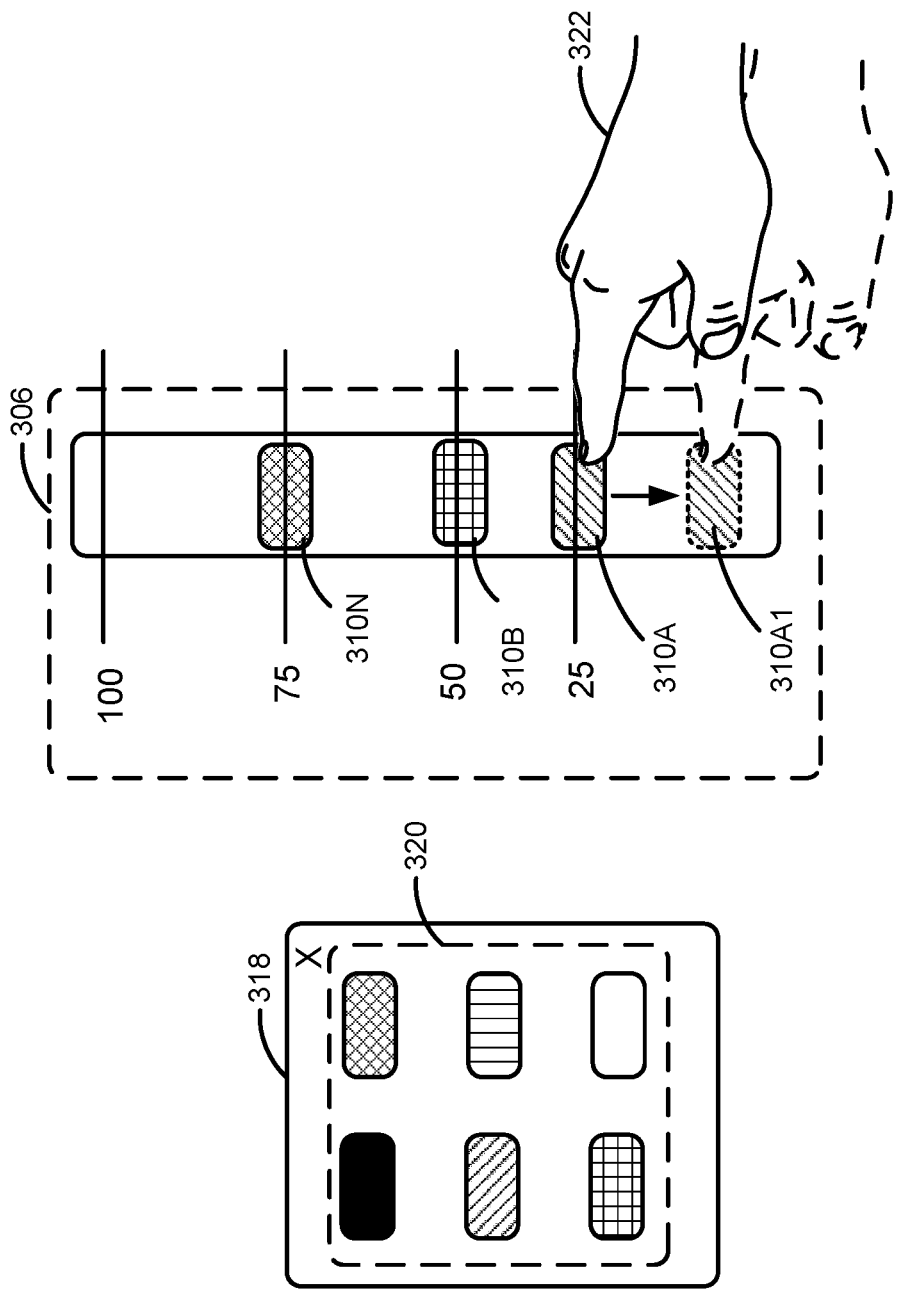

FIG. 3C is a UI diagram showing an exemplary threshold modification user interface 318 that may be used in conjunction with the threshold interface 306. The threshold modification user interface 318 may be rendered when an input, such as a selection of a portion of the threshold interface 306, is received. It should be noted that the threshold modification user interface 318 may be rendered along with the GUI 202 or may be rendered in a different user interface.

As shown in FIG. 3C, the threshold modification user interface 318 may present to a user options 320 for modifying one of the threshold indicators 310A-310N. The threshold modification user interface 318 may receive an input indicating a selection of one of the options 320 and may apply the selection to one of the threshold indicators 310A-310N. When applied to one of the threshold indicators 310A-310N, the appearance of data rendered in that particular section is changed to reflect the selection of one of the options 320.

In some configurations, the level of the threshold indicators 310A-310N may be changed. For example, the threshold interface 306 may receive an input that a user 322 has selected for movement the threshold indicator 310A. The user 322 may then move the threshold indicator 310A to the position indicated by a threshold indicator 310A1. It should be appreciated that the selection and movement of various aspects of the presently disclosed subject matter may be accomplished using various techniques such as a touch input as illustrated in FIG. 3C in addition to other techniques such as, but not limited to, a mouse, keyboard, or other input device appropriately configured.

Returning to FIG. 3A, the GUI 302 may also include a metric interface 304. In the depicted embodiment, the metric interface 304 is configured to receive an input from a user to provide the ability to, among other possibilities, determine which data sources provide the data to be rendered in the data visualization 308. The metric interface 304 may have one or more selectable interfaces that receive input from a user or other entity to select, sort, or filter the data rendered in the data visualization 308, shown in more detail in FIG. 3D. The metric interface 304 may be configured to receive an input to select or de-select a category, group, or metric to be rendered in the GUI 302.

Figure 3D:
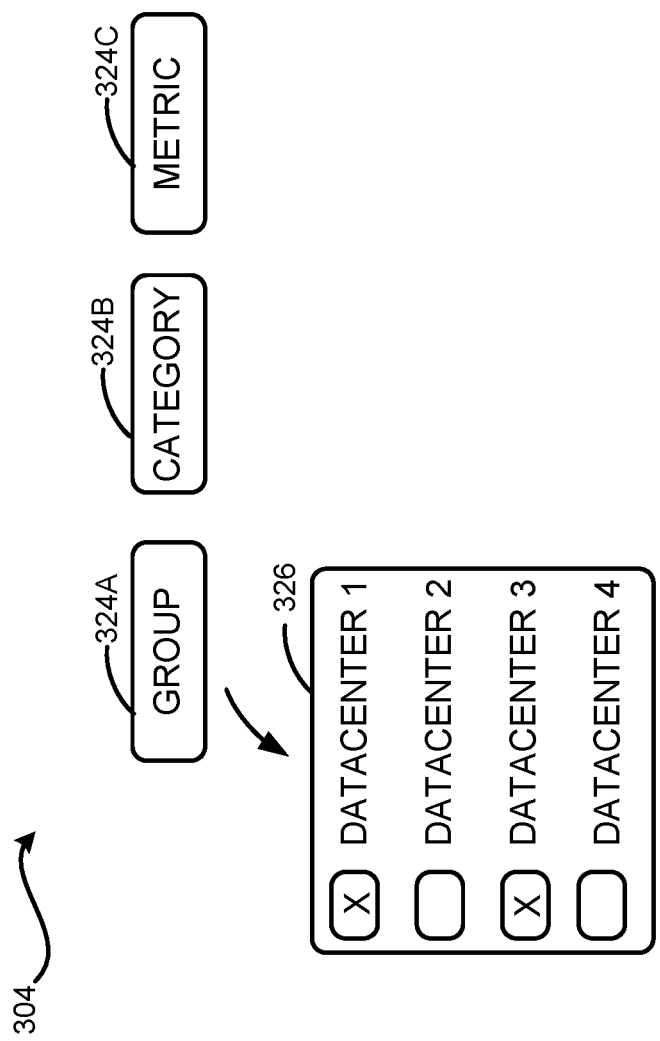

FIG. 3D is a diagram of the metric interface 304. The metric interface 304 may have selectable metric interfaces 324A-324C entitled, "GROUP," "CATEGORY," and "METRIC," respectively. It should be understood that the use of the terms for the selectable metric interfaces 324A-324C is merely an example and is not intended to limit the scope of the presently disclosed subject matter to any particular definition of these terms.

The selectable metric interfaces 324A-324B may be used by a user or other entity to include or filter out particular data. For example, an input may be detected at the metric interface 324A. A group selection box 326 may be rendered as a result of the receipt of the input. The group selection box 326 may provide a user with the ability to select the data centers for which data will be rendered in the data visualization 308.

Figure 3E:
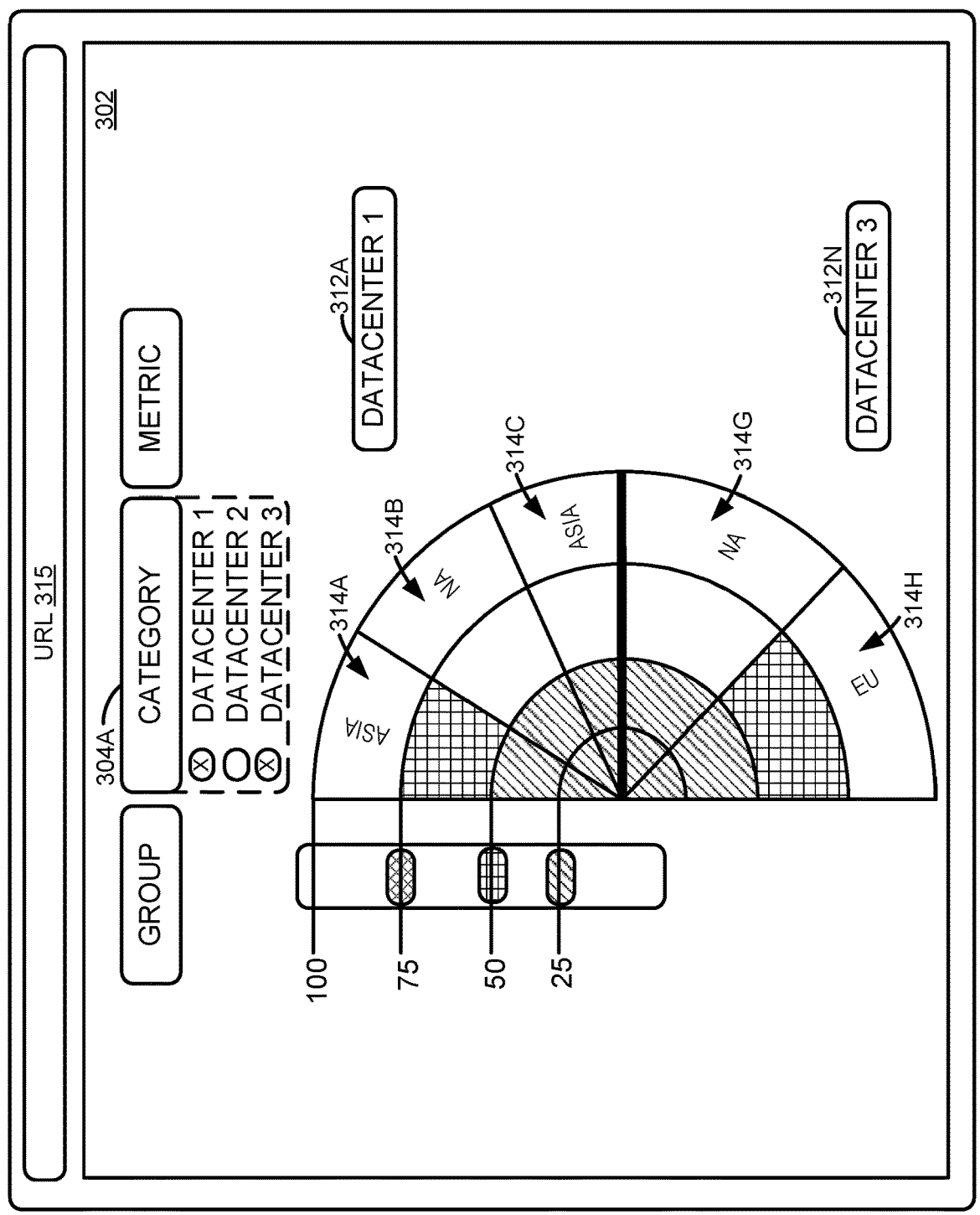

FIG. 3E is a UI diagram showing the de-selection of data to be rendered in the GUI 302. A metric interface 304A may be rendered and configured to receive an input to select or de-select one or more of the categories 312. When a selection input is received at the metric interface 304A, the metric interface 304A may be transformed to render a dropdown list of the categories available for selection or de-selection. For example, a de-selection of "DATACENTER 2" may transform the data visualization 308 of FIG. 3A to the data visualization 308 of FIG. 3E, whereby only data associated with DATACENTER 1 and DATACENTER 3 are rendered. Other types of selection/de-selection techniques may be used and are considered to be within the scope of the present disclosure.

Figure 3F:
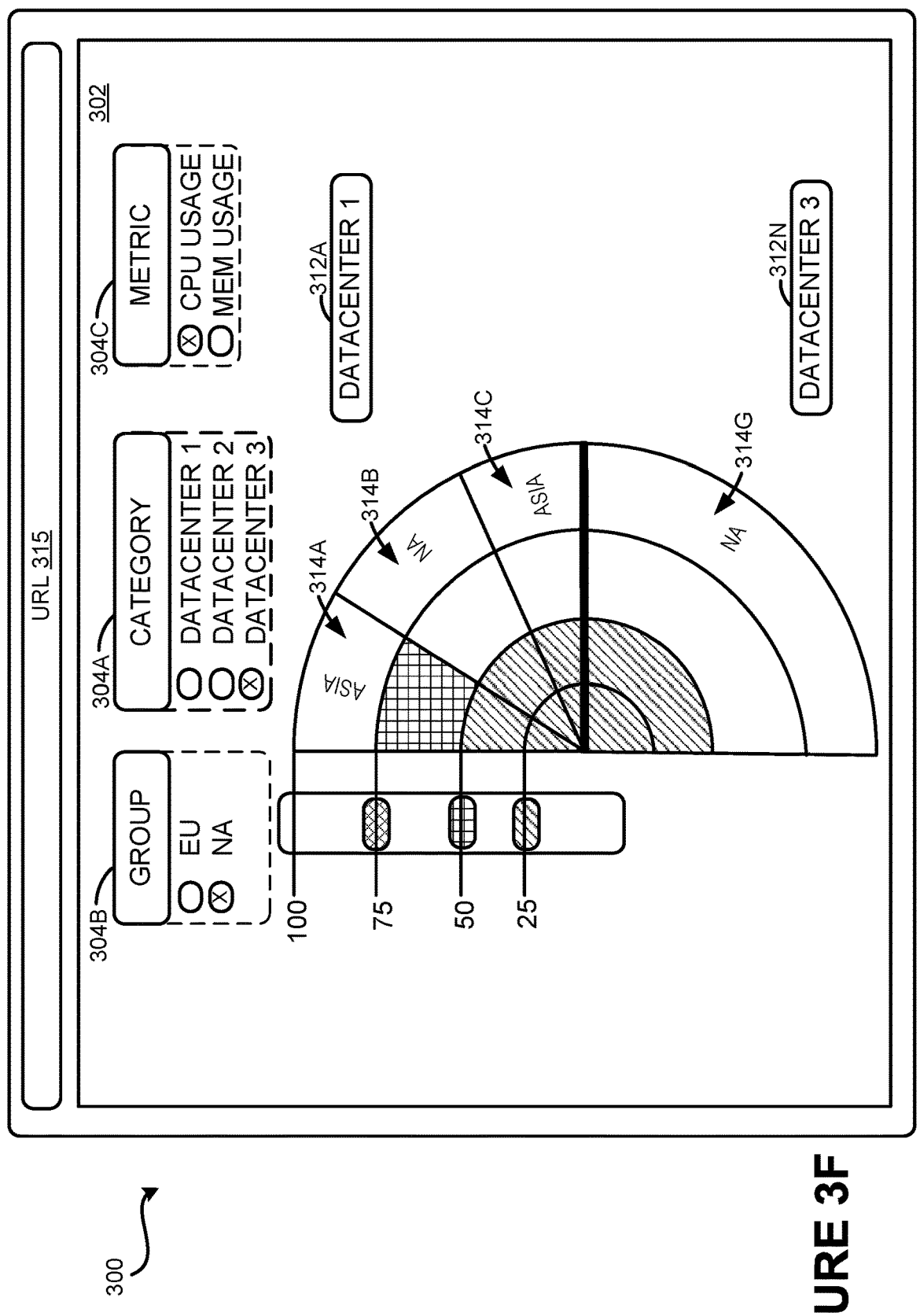

FIG. 3F is a UI diagram showing the de-selection of a group in a category rendered in the GUI 302. Rendered in the GUI 302 is a metric interface 304B. The metric interface 304B may be configured to receive an input regarding the selection or de-selection of one of the data items 314 of a particular category selected in the metric interface 304A. In the example illustrated in FIG. 3F, the group EU has been deselected from DATACENTER 3. Therefore, the GUI 302 may be transformed from the GUI 302 as illustrated in FIG. 3A to the GUI 302 as illustrated in FIG. 3F, where the data item 314G is the only data item rendered for the category 312N. Other types of selection/de-selection techniques may be used and are considered to be within the scope of the present disclosure.

FIG. 3F also illustrates how the particular metric to be rendered may be changed for any one of the categories 312 or the data items 314. The metric interface 304C may be rendered and configured to provide a user with the ability to select one or more metrics to be rendered for one or more of the categories 312 or the data source subgroups 314. In the configuration illustrated in FIG. 3F, a user or other entity has selected the metric "CPU USAGE" to be rendered in the NA group of the DATACENTER 3. Another metric rendered for possible selection is the metric "MEM USAGE," which may be associated with memory usage data. These and other metrics may be selected, and other selection techniques may be used, which all are considered to be within the scope of the present disclosure.

Figure 4:
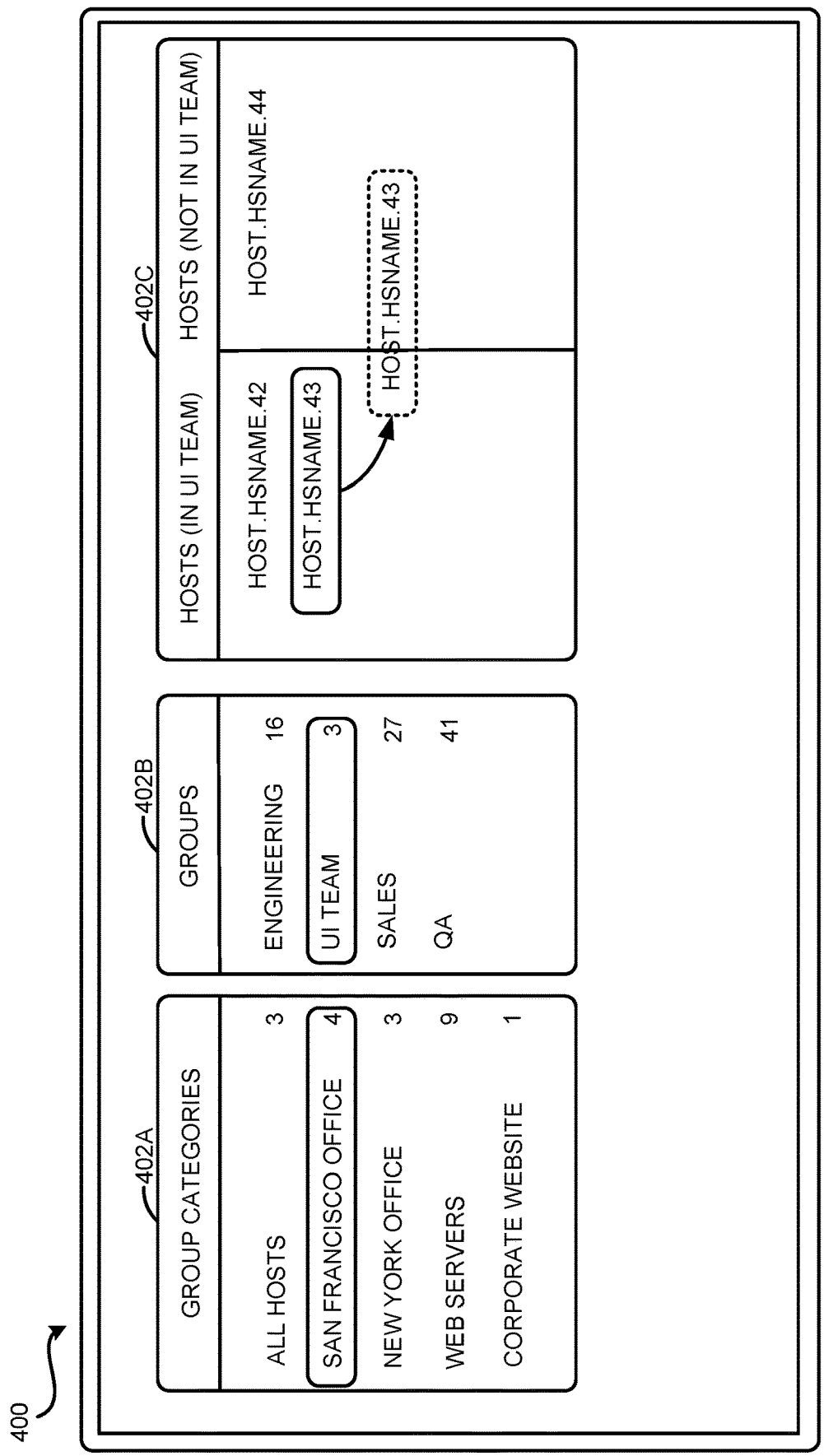
FIG. 4 is a UI diagram showing aspects of an exemplary data selection UI that may be used to select the data to be rendered in a data visualization, in accordance with some embodiments.

FIG. 4 is an example data source selection user interface 400 that may be used to select which data may be provided to the GUI 302 for rendering in the data visualization 308. The data source selection user interface 400 may be used to establish the categories 212 or 312. The data source selection user interface 400 may also be used to select the data items 314 and/or categories 312 to be visualized in data visualization 308.

In FIG. 4, group selection user interfaces 402A-402C are presented. It should be understood that the designation of any of the group selection user interfaces 402A-402C are for illustrative purposes only and are not an intent to limit the scope of the presently disclosed subject matter. Further, it should be understood that any terms used to designate portions described in FIG. 4 are for purposes of illustration only and may be modified according to a particular configuration.

The group selection user interfaces 402A-402C include selectable portions that allow a user to select which data source(s) are to provide data for rendering in the GUI 302. The group selection user interface 402A is entitled, "GROUP CATEGORIES." In the example provided in FIG. 4, "group categories" may be a top level partitioning of groups from which data sources may be located or associated with. For example, the group selection user interface 402A has group categories of "ALL HOSTS," "SAN FRANCISCO OFFICE," "NEW YORK OFFICE," "WEB SERVERS," and "CORPORATE WEBSITE." As shown by way of example, the group categories may include, but are not limited to, location, association, or use.

The next level of partitioning is rendered in the group selection user interface 402B, entitled "GROUPS." One or more "groups" may be a second level partitioning of the group categories of the group selection user interface 402A. It should be understood that a group, as used herein, is not limited to a particular data source. For example, a group may be a logical grouping of items the data represents, not necessarily the data sources. The particular groups may vary depending on which group category is selected. For example, if the group category of "SAN FRANCISCO OFFICE" is selected, the group selection user interface 402B may render the groups of "ENGINEERING," "UI TEAM," "SALES," and "QA."

The next level of partitioning is rendered in the group selection user interface 402C, collectively entitled "HOSTS." Data items for one or more "hosts" may be rendered upon the selection of one of the groups in the group selection user interface 402B, such as the UI TEAM. In some configurations, the group selection user interface 402C may include other items, such as servers, hosts, and the like, the present disclosure of which is not limited to any particular item in the group selection user interface 402C. The group selection user interface 402C has two parts, hosts associated with the UI TEAM but not included as a source of data, "HOSTS (NOT IN UI TEAM)," and hosts associated with the UI TEAM but are included as a source of data, "HOSTS (IN UI TEAM)." The status of a host as being included or not included as a source of data may be changed by moving the host from either part to the other part. For example, the host entitled, "HOST.HSNAME.43," originally included in the HOSTS (IN UI TEAM), has been selected and is in the process of being moved to the HOSTS (NOT IN UI TEAM). Once the move is complete, the host entitled, "HOST.HSNAME.43," will not be included as a source of data associated with the UI TEAM.

In addition to changing the sources of data, other aspects of a GUI may be modified. For example, as described above in relation to FIG. 3B, the data may change dynamically over a period of time. The change in the rendering of the data to reflect a change in the data may provide one visual indicator. Other visual indicators may be used.

Figure 5:
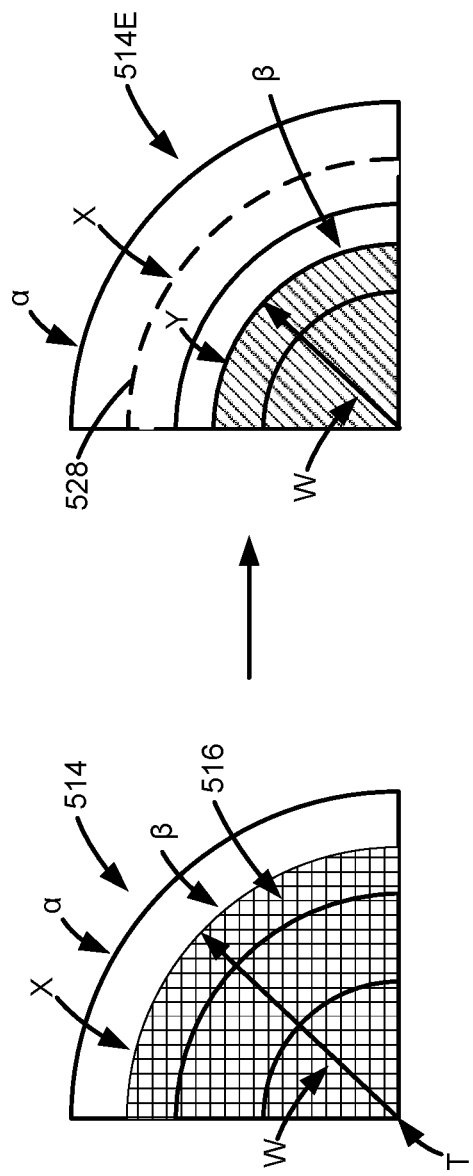
FIG. 5 is a UI diagram illustrating aspects of the use of a peak indicator to indicate a change in data, in accordance with some embodiments.

FIG. 5 is an illustration showing how a peak indicator may be used to indicate a change in data. Shown in FIG. 5 is a sector 514. The value indicator 516 associated with sector 514 initially has rendered a level of data represented by level "X." If the data changes to a lower level, such as the level indicated by level "Y," it may be beneficial to provide a user or other entity with an indication that the level has changed. In this manner, a peak indicator 528 may be used. The peak indicator 528 may indicate a change in position from one level to another level. In the example illustrated in FIG. 5, the change in level is from the level "X" to a lower level "Y." The peak indicator 528 may be rendered at level "X" for a certain period of time after the value changes to level "Y" to present to a user or other entity an indication of the change in level. In the example shown in FIG. 5, the peak indicator 528 has been presented as a dashed line. However, the peak indicator 528 might be presented in other ways in other implementations such as, but not limited to, using a particular color, a solid or bolded line, as well as alphanumeric characters.

As noted above in FIG. 3A, the indicator rendered in the sector 514 may have a variable radius and an arc that spans the sector 514. In FIG. 5, the value indicator 516 is rendered in a cross-hatch pattern on the left side and cross pattern on the right side of FIG. 5. The value indicator 516 has an origin T, which is at the center of the radial graph. The value indicator 516 also has a variable radius W. The variable radius W may vary from the origin T to an outer arc α of the data item 514. The value indicator 516 also has an edge arc β. The edge arc β has the same arc length as an arc of the data item at the variable radius T. In other words, the variable arc β extends across the data item 514.

The variable radius W adjusts to reflect a current value of a metric determined from real-time or substantially real-time data rendered in the data item 514. The value indicator 516 is rendered to fill an area defined by the variable radius Y and the edge arc β. For example, the area corresponding to a level "X" is represented in the cross-hatch pattern and the area corresponding to the level "Y" is rendered in a hatch pattern. As also illustrated, the fill pattern, which may also or instead be a color, is changed when the metric moves from the threshold associated with the level "X" to below the threshold associated with the level "X".

Figure 6:
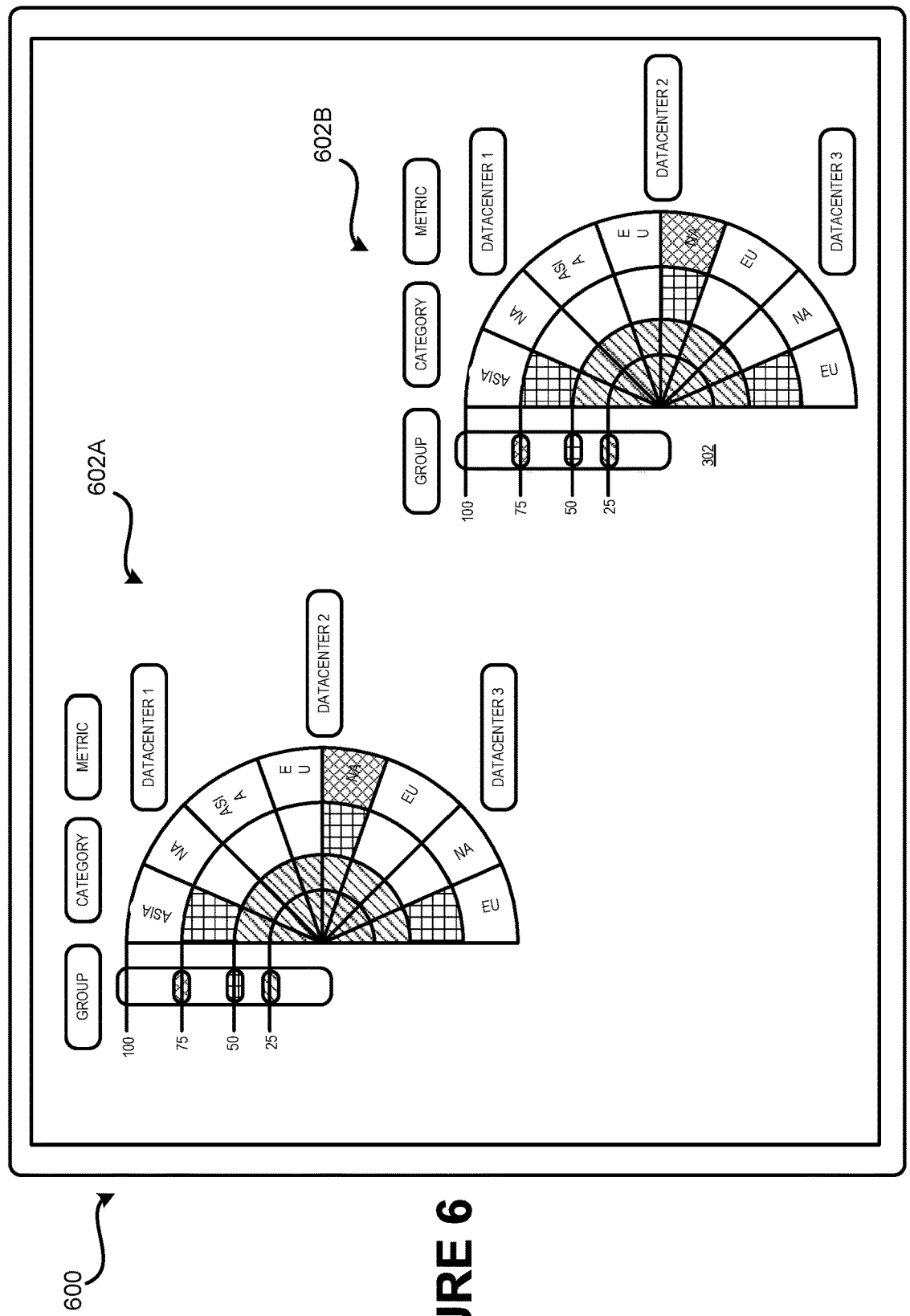
FIG. 6 is a UI diagram showing aspects of one embodiment wherein a single GUI includes multiple UIs for presenting a graphical display of searches performed on unstructured data, in accordance with some embodiments.

FIG. 6 is a UI diagram showing an exemplary display 600 that includes GUIs 602A and 602B that are rendered in a single display. Rendering the GUIs 602A and 602B in one screen may provide several benefits. For example, rendering the GUIs 602A and 602B in one screen may allow a user to visually compare the performance characteristics of several sets of data sources at one time. Rendering the GUIs 602A and 602B in one screen may also provide the benefit of being able to monitor more than one interesting or important GUI in one screen.

For example, the GUIs 602A and 602B may be associated with data sources that are operating at or near full CPU usage, which may portend possible issues the user may need to address. By rendering the GUIs 602A and 602B in one display, the user may be able to better monitor the GUIs 602A and 602B for possible issues when compared to monitoring the GUIs 602A and 602B in separate displays. It should be understood that the presently disclosed subject matter is not limited to any particular number of GUIs that may be rendered in the display 600.

4.0. Example Data Retrieval Process Flows

The flows described in this section illustrate several of the many possible data flows for retrieving, accessing, requesting, or otherwise identifying a set of values to visualize in a data visualization. Many alternative flows for retrieving data are also possible.

Figure 7:
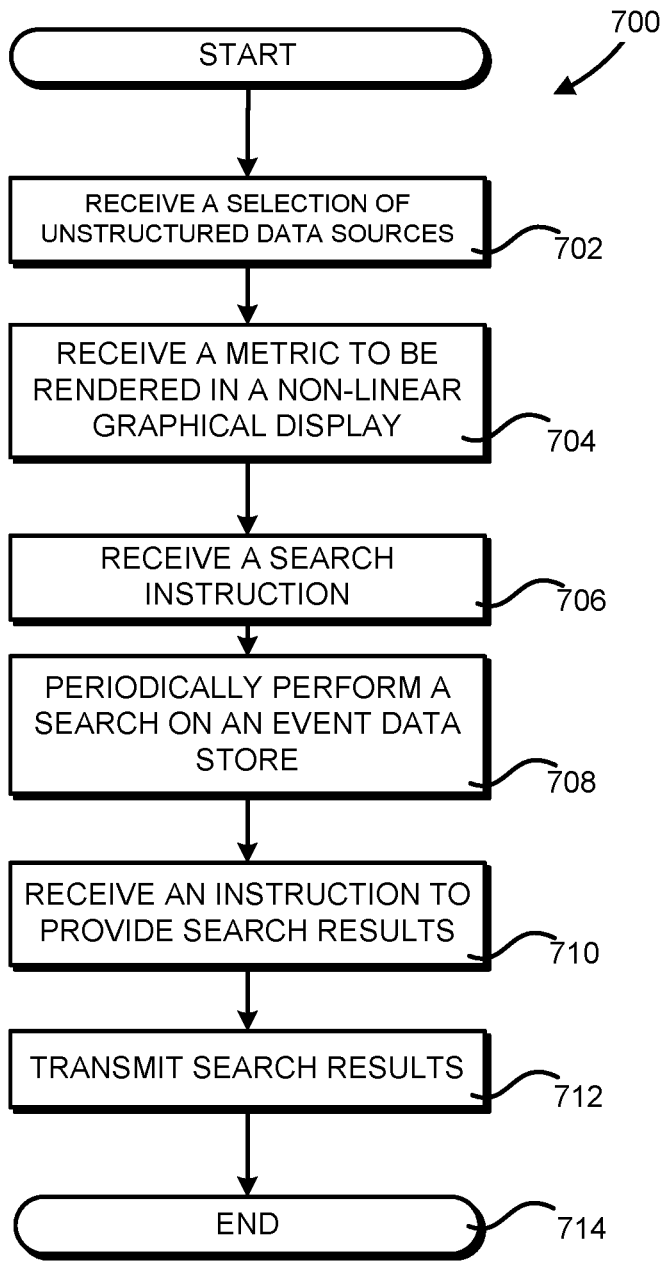
FIG. 7 is a flow diagram showing aspects of a method for retrieving data for rendering in a data visualization, in accordance with some embodiments.

FIG. 7 is a flow diagram showing aspects of a method 700 for retrieving data for dynamic rendering in a data visualization, in accordance with some embodiments. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated methods can be ended at any time and need not be performed in its entirety.

Flow 700 begins and proceeds to operation 702, where a selection of data sources is received. The data sources may be computers acting in a stand-alone basis or may be two or more computers grouped together in a manner similar to the categories, groups and hosts described in FIG. 4, and various combinations thereof. The data sources may generate the data to be depicted, or may be computing systems that receive data and provide the data to other computing systems.

The method 700 proceeds from operation 702 to operation 704, where a metric that is to be rendered in the data visualization 208 is received. The presently disclosed subject matter is not limited to any particular type, form or function of a metric. For example, a metric may be CPU usage, memory usage, and the like. In another example, a metric may be the particular group with which a computer is associated. In a further example, a metric may be particular nomenclature identifying a particular computer or group of computers. As described above, in certain configurations, the data visualization 208 may provide certain benefits. For example, changes in data near a 0 percent level may produce a smaller visual change than changes in data near a 100 percent level.

The method 700 proceeds from operation 704 to operation 706, where a search instruction is received. The search instruction may include specific metrics to search, time periods in which a search should be performed, and the like. The search instructions may be generated by a user or another component. For example, a software process may generate a search instruction in response to a condition, set point, and the like.

The method 700 proceeds from operation 706 to operation 708, where periodically a search is performed on a data repository, such as a time series data store. The time series data store may have stored event chunks. The event chunks may be generated at the time of a search or may be generated in accordance with other guidelines. The results of the search may be stored in the time series data store.

The method 700 proceeds from operation 708 to operation 710, where an instruction to provide a search result is received. It may be desirable to refresh the data rendered in the data visualization 208 in certain time periods. Thus, the instruction to provide the search result may be received according to those time periods. In another example, it may be desirable to refresh the data rendered in the data visualization 208 in the same time period at which the data is received. In this example, if the data is received into the data store every second, the request for the search data may be received every second as well to refresh the data at a rate equivalent to the rate at which the data is received.

The method 700 proceeds from operation 710 to operation 712, where the search results are transmitted to the requesting entity. In one configuration, the search results that are transmitted may be the data requested in the search. In this configuration, the entity requesting the search may perform the rendering aspect. In another configuration, the search results may be transmitted through the use of an accessible interface. For example, a URL may be provided to the entity requesting the search. The entity requesting the search may thereafter access the search results through the use of a web browser by entering the URL into the URL address bar. It should be noted that the presently disclosed subject matter does not require the transmission of a URL each time a search is requested, as the entity requesting the search may have been provided the URL previously. The method 700 then proceeds to operation 714, where it ends.

In an embodiment, each time a user changes an aspect of a visualization through the various interfaces described herein, a new URL is generated for the visualization. The URL may be shared with other individuals and/or bookmarked and accessed at subsequent times so as to access the same visualization that the user currently sees.

Figure 8:
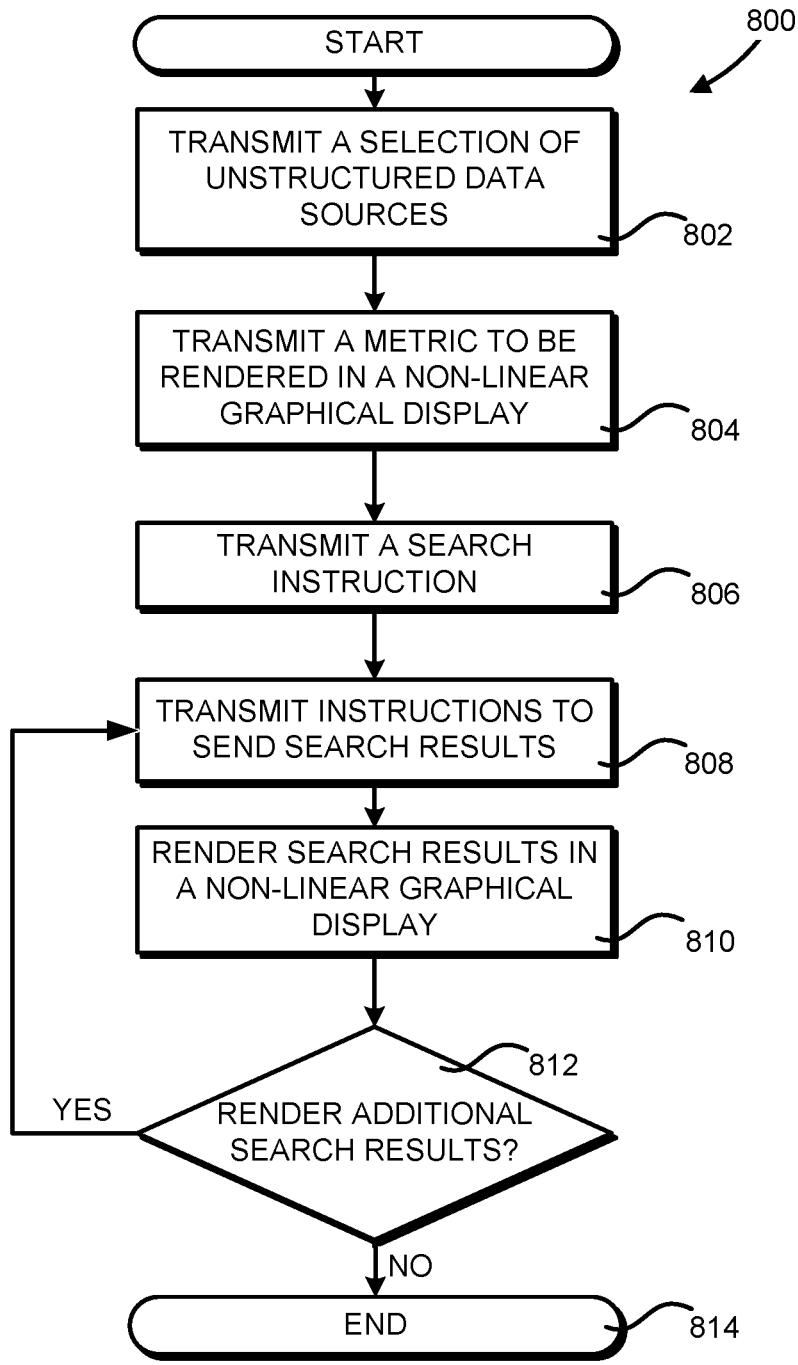
FIG. 8 is a flow diagram showing aspects of a method for rendering data in a data visualization, in accordance with some embodiments.

FIG. 8 is a flow diagram showing aspects of a method 800 for dynamically rendering unstructured data in a data visualization, in accordance with some embodiments. The method 800 begins and proceeds to operation 802, where a selection of data sources is transmitted to a search engine. The selection of the data sources may be facilitated using various user interfaces, including the data selection user interface 400 described with regard to FIG. 4.

The method 800 proceeds from operation 802 to operation 804, where an identification of a metric to be rendered in the data visualization 208 is transmitted to the search engine. In an embodiment, the metric may itself be a collection of individual metrics that may be selectable by a user to manipulate the data visualization 208, illustrated by way of example in FIGS. 3D and 3E. It should be appreciated that, depending on the particular configuration, the metric(s) may be transmitted at a different operation in the method 800. For example, the metric(s) may be transmitted at search time.

The method 800 proceeds from operation 804 to operation 806, where a search instruction is transmitted to the search engine. The search instruction may include time frames to search within, which data is to be searched and retrieved, and the like.

The method 800 proceeds from operation 806 to operation 808, where instructions to send search results are transmitted. It may be desirable to refresh the data rendered in the data visualization 208 in a certain timeframe, such as at a rate equivalent to the rate at which the data is received. For example, the data sources may provide new data every second. The search instructions may instruct the search engine to search for and retrieve the data every second, and the search request may be transmitted every one second to retrieve the search results. Thus, the data rendered in the data visualization 208 may be dynamic and represent nearly up-to-date information.

The method 800 proceeds from operation 808 to operation 810, where the results of the search are rendered in the data visualization 208. The data visualization 208 may be used to highlight certain areas of data while minimizing others.

The method 800 proceeds from operation 810 to operation 812, where a determination is made as to whether or not data is still to be rendered in the data visualization 208. If it is determined that data is still to be rendered, the method 800 proceeds from operation 812 to operation 808, where the method 800 proceeds as described above. If it is determined that data is no longer to be rendered, the operation proceeds to end.

5.0. Example System Architectures

As has been described, the data and/or values rendered in the radial graphs or like embodiment may come from any kind of data. The techniques described herein may therefore be performed with respect to data obtained from any of a variety of types of data server systems. Generally, a data server system is a system that performs data operations with respect to data stored in one or more repositories of data. Depending on the type of data server system, the data operations may range from simple operations, such as storing and retrieving the data, to more complex operations such as calculating statistics based on the data, and/or arranging or formatting the data. One example of a data server system is a relational database system, in which data is stored in highly structured tables, and accessed through rigid schemas. Another example of a data server system is a file system, such as a Network File System server. Yet another example of a data server system is a web application server.

Another example of a data server system is an event-based system, such as the SPLUNK® ENTERPRISE software produced and sold for on-premise and cloud use by Splunk Inc. of San Francisco, Calif. SPLUNK® ENTERPRISE is a comprehensive system that generates, stores, retrieves, and searches event data. SPLUNK® ENTERPRISE has gained particular appeal in the market for deriving events from unstructured data and machine data. It is the leading software for providing real-time operational intelligence, enabling organizations to collect, index, and harness machine-generated big data coming from the websites, applications, servers, networks, mobile devices, etc., that power their businesses.

In some event-based systems, data is derived from lines or rows of unstructured time-series data. Some of the many examples of such data include web logs and machine logs. Each row (or a group of rows) is generally associated with a timestamp and a series of one or more associated data points or parameter-value pairs. Based on the timestamps, data structures known as events are derived from the associated data, and include a portion of the associated data. A variety of event types may be derived from such data. For example, in the context of web logs, events may be derived for errors, specific user inputs, navigation events, and so forth. Some event-based systems feature flexible schemas that may be redefined as needed, or even at the time that a request to perform an operation is received. Such a schema indicates how to extract one or more pieces of data from the associated data included in an event For example, at a high level, SPLUNK® ENTERPRISE can take raw data, unstructured data, or machine data such as data in Web logs, syslogs, sensor readings, etc., divide the data up into portions, and optionally transform at least part of the data in these portions to produce time-stamped events. The software derives the time stamp for each event by extracting it from the event data itself or by interpolating an event's time stamp relative to other events for which the software can derive a time stamp. SPLUNK® ENTERPRISE then stores the events in a time-series data store against which it can run queries to retrieve events that meet specified criteria, such as having certain keywords and/or having certain value(s) for certain defined field(s).

Certain techniques described herein may be particularly useful in data server systems that employ so-called "late-binding schemas." For example, SPLUNK® ENTERPRISE is particularly noteworthy for its implementation of late-binding schemas. As noted, an event is a data item that typically contains a portion of raw data (or a transformed version of such). To run certain types of queries against these and other data items, a schema can be developed. A schema includes field definition data that defines a set of named fields, or properties, for which each data item in a repository may have a value. In many data server systems, the schema is pre-defined, such that data items are stored in a refined format (e.g. a relational table) that is optimized for access using semantics defined by the schema. A late-binding schema, by contrast, is not necessarily pre-defined when data items are stored. Rather, the field definition data in a late-binding schema includes extraction rules for deriving values for the fields from a rawer format that is not necessarily optimized for access using the semantics of the schema.

The extraction rule for a field is logic comprising one or more instructions that specify how to extract a value from each of a subset of data items for which the field has been defined. The extraction rule for a field is often defined using a regular expression ("regex" rule) or other search pattern, but can also or instead include any suitable type of instruction for locating, in each data item, a chunk of the data item that corresponds to the field. The located chunk may be the value of the field for the data item, or the extraction rule may further include processing instructions to derive the value from the chunk through one or more transformation or conversion operations.

In an embodiment, in certain data server systems, such as SPLUNK® ENTERPRISE, a late-binding schema is not defined at index time as with conventional database technology. Rather, in a system involving late-binding schema, the schema can be developed on an ongoing basis up until the time it needs to be applied. In some embodiments, a late-binding schema is not applied until the time that a query is actually executed. For instance, the query may specify the criteria for data items of interest, in terms of data items having specified value(s) for specified field(s). Extraction rule(s) for the specified field(s) may be provided in the query, or located during execution of the query, and a field extractor may use the extraction rules to dynamically derive values from any data items involved in the query during execution of the query. As a data analyst learns more about the data in stored events, using a late-binding schema, he or she can continue to develop the schema up until the next time it is needed for a query. Hence, for example, a field for the same data items may have different values for different queries, and/or new fields may become available for the data items, based on a changing schema.

Because SPLUNK® ENTERPRISE maintains the underlying searchable raw data and enables application of a late-binding schema, it has great power to enable dynamic investigation of issues that arise as a data analyst learns more about the data stored in the system's events. Consequently, some of the techniques described herein are described with respect to an example SPLUNK® ENTERPRISE. However, it will be apparent that the techniques are equally applicable to data server systems that do not necessarily comprise all of the features of SPLUNK® ENTERPRISE.

As discussed herein, "time-series data" and "time-series machine data" may include, among other elements, a series or sequence of data points generated by one or more data sources, computing devices, or sensors. Each data point may be a value, a small segment of data, or a large segment of data, and each data point may be associated with a timestamp or be associated with a particular point in time that provides the basis for a timestamp for the data point. The series of data points, or values/statistics derived from the data points, may be plotted over a time range or time axis representing at least a portion of the time range. The data can be structured, unstructured, or semi-structured and can come from files, directories, network packets, network events, and/or sensors. As used herein, "unstructured" data may refer, for example, to data whose structure is not fully understood or appreciated at the time the data is obtained by a data storage system, or it may refer to data that was generated without a particular schema in mind to facilitate the extraction of values for fields in the data during a search on the data. Machine data generated by, for example, data sources within an enterprise network environment is generally considered to be unstructured data. The visualization of such time-series data may be used to display statistical trends over time. The time-series machine data collected from a data source may be segmented or otherwise transformed into discrete events, where each event can be associated with a timestamp.

An "event" may include a single record of activity from a particular data source associated with a single timestamp. Such an event may correspond to, for example, one or more lines in a log file or other data input. Further, "events" may be derived from processing or indexing machine data, as described herein, or may include other kinds of events or notable events described herein. Events can also correspond to any time-series data, such as performance measurements of an IT component (e.g., a computer cluster, node, host, virtual machine, etc.), a sensor measurement, etc. For convenience, some of the techniques described herein are described with respect to events. However, it should be understood that, unless otherwise apparent, the techniques described herein may be equally applicable to any type of data item, including data items that do not include a time element.

In an example, a field extractor within an enterprise network environment may be configured to automatically identify (e.g., using regular expression-based rules, delimiter-based rules, etc.) certain fields in the events while the events are being created, indexed, and/or stored. Alternatively, one or more fields can be identified within the events and added to the field extraction rules (used by the field extractor to identify fields within the events) by a user using a variety of techniques. Additionally, fields that correspond to metadata about the events, such as a timestamp, host, source, and source type for an event, may also be created automatically. Such fields may, in some cases, be referred to as "default fields" if they are determined automatically for all events at the time such events are created, indexed, and/or stored.

In some implementations, a given tag or alias may be assigned to a set of two or more fields to identify multiple fields that correspond to equivalent pieces of information, even though those fields may have different names or be defined for different sets of events. A set of tags or aliases used to identify equivalent fields in this way may be referred to as a common information model.

In some embodiments, data generated by various data sources may be collected and segmented into discrete events, each event corresponding to data from a particular point in time. Examples of such data sources include, but are not limited to, web servers, application servers, databases, firewalls, routers, operating systems, software applications executable at one or more computing devices within the enterprise data system, mobile devices, sensors, etc. The types of data generated by such data sources may be in various forms including, for example and without limitation, server log files, activity log files, configuration files, messages, network packet data, performance measurements or metrics, sensor measurements, etc.

FIG. 1 shows a block diagram of an example data intake and query system 100, similar to that found in SPLUNK® ENTERPRISE. Generally, the system 100 includes one or more forwarders 101 that collect data received or retrieved from a variety of different data sources 105, and one or more indexers 102 that store, process, and/or perform operations with respect to the data. The forwarders 101 determine which indexer or indexers 102 are to receive the collected data and forward the data to one or more indexers 102. The data typically includes streams of time-series data. In this context, time-series data refers to any data that can be segmented such that each segment can be associated with a time stamp. The data can be structured, unstructured, or semi-structured, and can come from files and directories. In this context, unstructured data is data that is not organized to facilitate the extraction of values for fields from the data, as is often the case with machine data and web logs, two popular data sources for SPLUNK® ENTERPRISE. Alternatively, certain forwarders 101 referred to as "heavy forwarders" can strip out extraneous data and detect time stamps for the data. Based on the time stamps, the heavy forwarders can index and group the data into buckets that fall within a common time span. The heavy forwarders then determine which indexer or indexers 102 are to receive each bucket of data and forward the data to one or more indexers 102.

Figure 9:
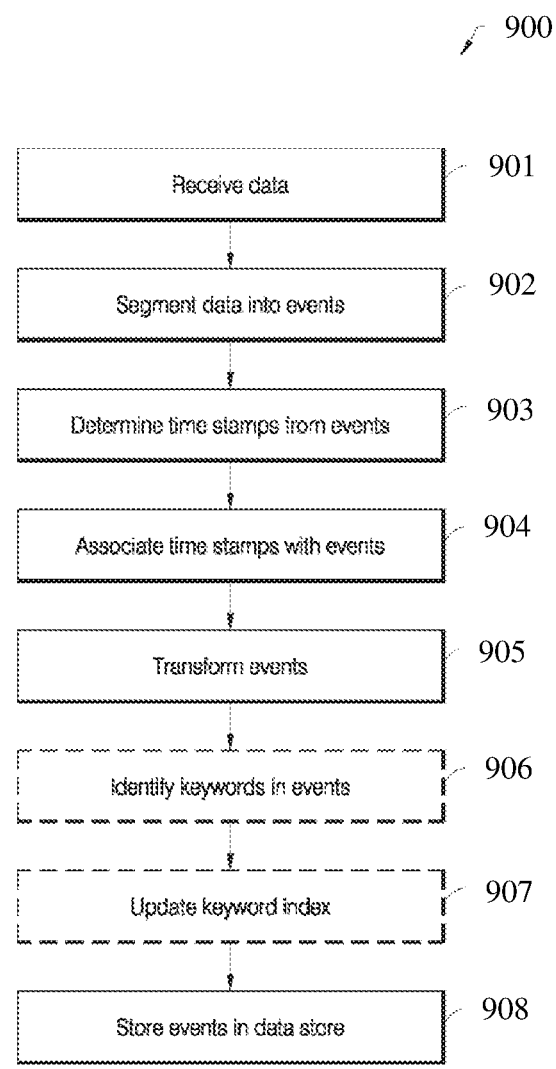
FIG. 9 illustrates a flowchart of a process that indexers may use to process, index, and store data received from forwarders, according to an embodiment.

FIG. 9 is a flowchart 900 of a process that an indexing component, such as indexers 102, may use to process, index, and store data received from forwarders, such as the forwarders 101. At block 901, an indexer receives data from a forwarder. At block 902, the indexer segments the data into events. The data typically consists of many lines of text that are separated by a carriage return or line break. An event may consist of one or more of these lines. The task of the indexer is to determine where an event begins and ends in the lines of data. The indexer can use heuristics that allow it to automatically determine how many lines constitute an event. The indexer may be informed of the source of the data and have a set of heuristic rules for the source. The indexer may also be able to examine a sampling of the data and automatically determine the source of the data and have a set of heuristic rules for that source. These heuristics allow the indexer to use regular expression-based rules, delimiter-based rules, etc., to examine the text in each line in order to combine lines of data to form an event. The indexer can examine the text for event boundaries within the text that include, but are not limited to: predefined characters, character strings, etc. These may include certain punctuation marks or special characters including, for example, carriage returns, tabs, spaces, line breaks, etc. In some instances, a user can fine tune or configure the rules that the indexers use to examine the text in order to adapt to the user's equipment.

The indexer determines a time stamp for each event at block 903. The time stamp can be determined by extracting the time from data in the event, or by interpolating the time based on time stamps from other events. In some cases, a time stamp can be determined from the time the data was received or generated. The indexer associates the time stamp with each event at block 904. For example, the time stamp may be stored as metadata for the event.

At block 905, the data included in a given event can be transformed. Such a transformation can include such actions as removing part of an event (e.g., a portion used to define event boundaries, extraneous text, characters, etc.) or removing redundant portions of an event. A user can specify a portion to remove using a regular expression or any similar method.

Optionally, a keyword index can be built to facilitate fast keyword searching of events. To build such an index, in block 906, the indexer identifies a set of keywords contained in the events. At block 907, the indexer includes each identified keyword in an index, which associates with each stored keyword pointers to each event containing that keyword (or locations within events where that keyword is found). When an indexer receives a keyword-based query, the indexer can then consult this index to quickly find those events containing the keyword without having to examine again each individual event, thereby greatly accelerating keyword searches.

In an embodiment, the keyword index may further include entries for name-value pairs found in events (e.g. a pair of keywords or other tokens connected by a certain symbol, such as an equals ("=") sign or colon). Certain combinations of name-value pairs may be indexed, so that events having those combinations may be quickly located. In an embodiment, fields may automatically be generated for some or all of the name-value pairs at the time of indexing. For example, if the string "dest=10.0.1.2" is found in an event, a field named "dest" may be created for the event, and assigned a value of "10.0.1.2."

The indexer stores events in a data store at block 908. The data can be stored in working, short-term and/or long-term memory in a manner retrievable by query. The time stamp can be stored along with each event to help optimize searching the events by time range.

In some instances, the stored data includes a plurality of individual storage buckets, each corresponding to a time range. An event can then be stored in a bucket associated with a time range inclusive of the event's time stamp. This not only optimizes time-based searches, but it can allow events with recent time stamps that may have a higher likelihood of being accessed to be stored at preferable memory locations that lend to quicker subsequent retrieval (such as flash memory instead of hard disk media).

Data stores 103 may be distributed across multiple indexers, each responsible for storing and searching a subset, or buckets, of the events generated by the system. By distributing the time-based buckets among the indexers, the indexers can find events responsive to a query in parallel using map-reduce techniques, each returning their partial responses for specific buckets to the query to a search head that combines the results together to answer the query.

Figure 15:
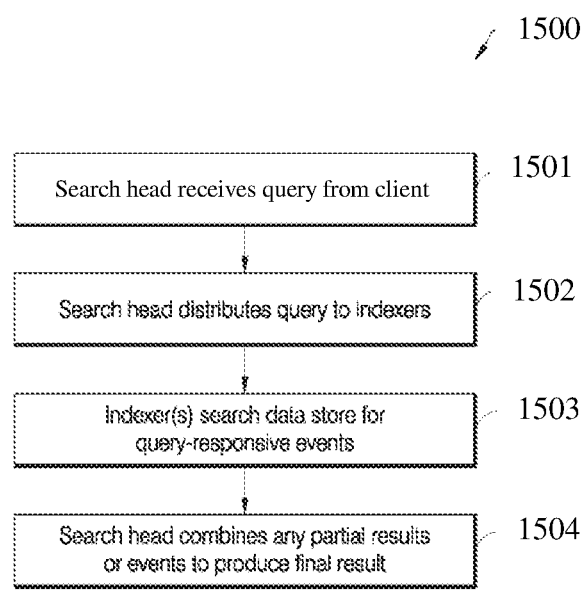
FIG. 15 illustrates a flowchart of a process that a search head and indexers perform during a typical search query, according to an embodiment.

FIG. 15 is a flowchart 1500 of a process that a search head 104 and indexers 102 may perform during an example search query. At block 1501, a search head receives a query from a client.

At block 1502, the search head is responsible for analyzing the search query to determine what part can be delegated for execution by indexers and what part needs to be executed by the search head. Streaming commands can be trivially delegated to the indexers. Conversely, aggregating commands are more complex to distribute.

The search head can perform optimization steps in order to make the search more efficient. As mentioned above, the indexers may create an index of keywords. In one optimization, before the search starts executing, the search head determines the time range required for the search and a set of common keywords that all matching events must have. The retrieval phase uses these parameters to query the indexers for a superset of the eventual results. The indexers return the superset of results that the search head can perform a filtering stage on. The filtering stage performs field extraction on the superset to arrive at a reduced set of search results.

In another optimization, to achieve better computation distribution and minimize the amount of data transferred between indexers and the search head, many aggregating commands implement a map operation which the search head can delegate to the indexers, while executing the reduce operation locally. FIG. 16 shows an example of a search query 1601 received from a client that the search head can split into two parts: a "map" part, comprising a number of subtasks (e.g. data retrieval or simple filtering) that may potentially be performed in parallel, that are "mapped" to indexers 1602 for execution, and a "reduce" part to be executed by the search head 1603 as results are collected from the indexers 1602. Here, the search query 1601 makes the indexers responsible for counting the results by host and then sending their results to the search head. The search head 1603 then performs the merging. This achieves both computation distribution and minimal data transfer.

The search head 1603 distributes the search query 1602 to one or more distributed indexers. The search queries 1601 and 1602 may contain one or more criterions for the data to be searched or operations on portions of the data that meet the criteria. These queries may also contain one or more names that each reference a field (which is in turned defined by an extraction rule), as well as criteria that must be met for the values for that field or operations on the values for the field.

At block 1503, one or more indexers to which the query was distributed search their data store(s) for events responsive to the query. To determine events responsive to the query, a searching indexer finds events specified by the criteria in the query. This criteria can include that the events that have particular keywords or contain specified value(s) for specified field(s). In embodiments that employ a late-binding schema, block 1503 may comprise the extraction of values from events for specified fields, at the time the query is processed, in order to determine events that meet the specified criteria. It should be appreciated that, to achieve high availability and to provide for disaster recovery, events may be replicated in multiple data stores, in which case indexers that have access to the redundant events but are not assigned as the primary indexer for those events would not respond to the query by processing the redundant events.

In an example, the indexer finds events for which it is the primary indexer that fall within a block of time specified by the criteria. The indexer then processes the contents of the events using the one or more regular expressions, extracting information associated with fields specified by the one or more regular expressions. The indexers can either stream the relevant events back to the search head, or use the events to calculate a partial result responsive to the query, and send the partial result back to the search head. At block 1504, the search head combines or reduces all of the partial results or events received from the parallel processing indexers together to determine a final result responsive to the query.

In an embodiment, data intake and query system 100 may be configured to operate in a variety of different search modes. For example, one search mode involves streaming results back to a client in real time as they are identified. Another search mode involves waiting to report results to the client until a complete result is ready to return to the client. Yet another search mode involves streaming interim results back to the client in real-time until a complete result is ready, and then returning the complete result. In an embodiment, certain types of results may be stored for an amount of time at the system 100 as "search jobs," so that a client may retrieve the results by referencing the search job.

Data intake and query system 100 and the processes described with respect to FIGS. 1, 9, 15, and 16 are further discussed and elaborated upon in Carasso, David. Exploring Splunk Search Processing Language (SPL) Primer and Cookbook. New York: CITO Research, 2012 and in Ledion Bitincka, Archana Ganapathi, Stephen Sorkin, and Steve Zhang. Optimizing data analysis with a semi-structured time series database. In SLAML, 2010. Each of these references is hereby incorporated by reference in its entirety for all purposes.

Figure 17:
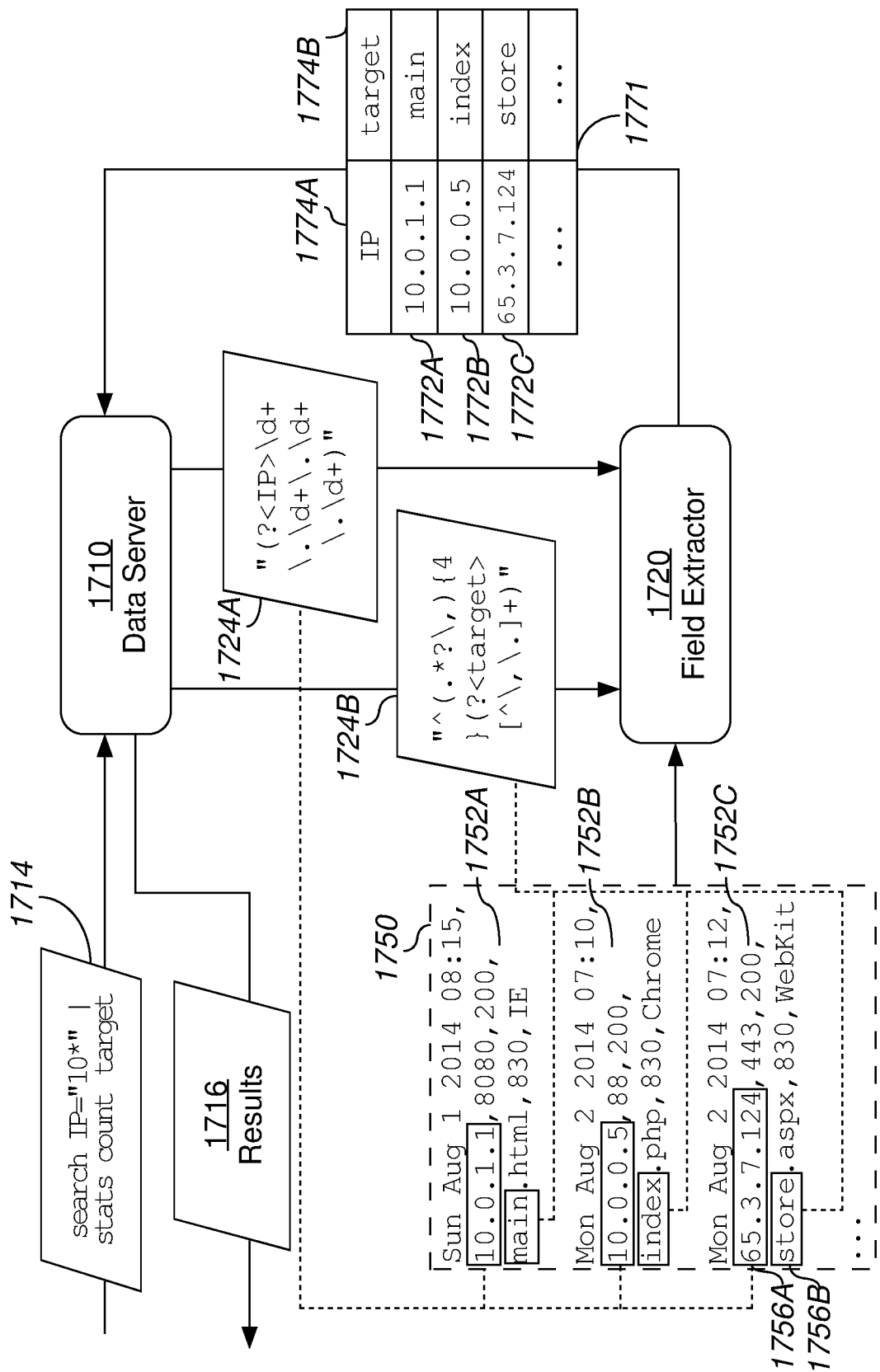
FIG. 17 is a block diagram that illustrates a subsystem comprising components configured to execute search requests, or portions thereof, that reference fields defined using extraction rules, according to an embodiment.

FIG. 17 is a block diagram that illustrates a subsystem 1700 comprising components configured to execute search requests, or portions thereof, that reference fields defined using extraction rules, according to an embodiment. Subsystem 1700 may be, for instance, a set of components within data intake and query system 100, or within any other data server system. Subsystem 1700 comprises a data server 1710, implemented by a set of one or more processes, executed by processors or other suitable components on one or more server computing devices. Data server 1710 is configured to perform data operations, such as executing search queries, with respect to sets of data items 1752 in a data repository 1750. For instance, data server 1710 may be one or more of indexers 102 and/or a search head 104, data items 1752 may be events and/or lines of raw data, and data repository 1750 may be one or more of data stores 103. While only data items 1752a-c are depicted, it will be appreciated that data repository 1750 may in fact store a large number of additional data items 1752, potentially having a variety of different underlying formats and structures.

Data server 1710 may perform data operations for a variety of reasons, including in response to one or more requests 1714 received by the data server 1710. A request 1714 may take any suitable form, depending on the embodiment. For instance, a request 1714 may take the form of a statement in a query language such as Search Processing Language ("SPL") in the example SPLUNK ENTERPRISE system, Structured Query Language ("SQL"), or any other suitable query language. As another example, a request 1714 may be formatted as Hyper-Text Protocol ("HTTP") GET requests or POST requests. The request 1714 may be a full query, or a portion of a query that has been delegated to the data server 1710 by, for example, search head 104.

In at least some instances, data server 1710 will execute data operations that reference named fields in data items 1752. For instance, as depicted, query 1714 references fields named "IP" and "target." Thus, in order to execute query 1714, data server 1710 needs to know what the values of these fields are for some or all of the data items 1752 in data repository 1750. However, the values for some or all of these named fields may not already be for the data items 1752, and as a consequence data server 1710 may not be able to retrieve values for those fields using traditional database techniques. For example, the data server 1710 may be unable to directly locate values for the fields in terms of addresses within a storage system, as may occur in a relational database system, or in terms of pre-defined semantic labels within the data items itself, as may occur in traditional XML-based systems. Instead, data server 1710 is configured to utilize a field extractor component 1720 to dynamically derive field values 1771 for those fields, as needed during query execution. Though depicted as logically separate from data server 1710, field extractor 1720 may be a subcomponent of data server 1710, or a distinct component of subsystem 1700, depending on the embodiment.

Field extractor 1720 derives values for a field based on applying an extraction rule 1724 associated with that field to some or all of the data items 1752. Each name of a field may be used to reference the extraction rule 1724 associated with the field, and this extraction rule encompasses the logic for locating, in a data item, a chunk of the data item (a value) that corresponds to the field for that data item. In an embodiment, a field extraction rule 1724 may specify the location of a value for a field in terms of instruction(s) for parsing and/or analyzing the actual contents of a data item for specified patterns. For example, a field extraction rule 1724 may include a pattern matching instruction, such as a regular expression or portion thereof, by which the location of a chunk of a data item 1752 that corresponds to the field may be identified, and the chunk may be extracted from the data item 1752. Moreover, a field extraction rule 1724 may specify patterns to search for using any suitable convention, and not just regular expressions.

In some embodiments, the chunk is the value of the field for the data item. In other embodiments, a field extraction rule 1724 may further include one or more instructions for deriving a value for the field from the located chunk based on applying a function, formula, or other specified operation to the located chunk. For instance, a transformation rule may truncate the located chunk, or convert the located chunk into a different form.

When executing a query 1714 that references a named field, the data server 1710 will send the corresponding extraction rule 1724 to field extractor 1720, or otherwise provide data to the field extractor 1720 that indicates a corresponding extraction rule 1724 to process. For instance, data server 1710 may indicate which field names are involved in query 1714 and request that field extractor 1720 locate the corresponding field extraction rules 1724A and 1724B for those fields. Depending on the embodiment, the data server 1710 instructs the field extractor 1720 to apply the field extraction rule to all data items 1752 in a repository 1750, or to only a subset of data items 1752 that has already been filtered based on other criteria in the query 1714. Moreover, a field may be defined only for certain subset of the events that have been stored in data stores 103, in which case the field extraction rules associated with the field may only be applied to such events during a search.

The data server 1710 (or field extractor 1720) may identify an extraction rule 1724 to apply using a variety of techniques. For instance, a collection of extraction rules may be stored in a knowledge base, which functions as a repository of metadata concerning the data items 1752. A mapping between field names and extraction rules may be stored, by which a suitable extraction rule 1724 may be located when the corresponding field name is mentioned in a query 1714. Or, a field extractor 1724 may automatically process all field extraction rules 1724 within a knowledge base that are associated with specific data items targeted by the query 1714. As another example, the query 1714 may itself specify an extraction rule 1724. As yet another example, data server 1710 and/or field extractor 1720 may be configured to identify an extraction rule 1724 by instructing an extraction rule generator to generate the extraction rule based on one or more pre-defined field extraction templates, which specify a set of field names, a delimiter for dividing up data items, and ordering data for mapping those field names to chunks of the data item resulting from the dividing.

The effect of the example extraction rules 1724 is illustrated with respect to example data items 1752a-c of repository 1750. Chunks such as chunk 1756a are located through extraction rule 1724a, which as depicted instructs the field extractor 1720 to look for a pattern of one or more digits, followed by a period, followed again by one or more digits, followed by another period, followed again by one or more digits, followed by another period, and finally followed again by one or more digits. These chunks are extracted as values for field 1774a. Chunks such as chunk 1756b are located through extraction rule 1724b, which as depicted instructs the field extractor 1720 to skip past the first four commas in a data item 1752, and then extract all characters until a comma or period has been reached. These chunks are extracted as values for field 1774b. Note that values 1771 comprise three different sets 1772 of values, since a value was extracted for each of the fields 1774 for each of the three example data items 1752. While values 1771 are illustrated in a table for convenience, it should be noted that field extractor 1720 may output values 1771 in any suitable format or provide them to data server 1010 to use the values to compare with search criteria in request 1014 on-the-fly without ever storing the values in a table.

Data server 1710 may then utilize values 1771 to perform the data operation(s) requested in request 1714. Depending on the data operations requested, a response 1716 may not necessarily include all or even any of values 1771. For example, response 1716 may include some or all of values 1771, statistics calculated based on values 1771, a data set filtered based on values 1771, a report in which certain values 1771 are embedded, a visualization such as a graph or chart based on values 1771, and/or other elements. In an embodiment, results 1716 may be returned directly to a client, or to a search head or other component for further processing. In an embodiment, in addition to values 1771 or data derived therefrom, results 1716 may include or reference the actual data items 1752 from which the values 1771 were derived.

In an embodiment, rather than reorganizing or converting the data based on the named fields, certain techniques described herein keep the data in the form it was initially stored. The field extraction rules are applied dynamically, at the time of a user's query, thus preserving the data in its initial form for future analysis. For instance, it may in the future become necessary to redefine the fields and/or create new fields. Because the data is stored in its original form, fields may easily be redefined as needed, and may even differ from one query to another.

In an embodiment, a data server system such as SPLUNK® ENTERPRISE can accelerate some queries used to periodically generate reports that, upon each subsequent execution, are intended to include updated data. To accelerate such reports, a summarization engine periodically generates a summary of data responsive to the query for a defined, non-overlapping subset of the time period covered by the report. For example, where the query is meant to identify events meeting specified criteria, a summary for a given time period may include only those events meeting the criteria. Likewise, if the query is for a statistic calculated from events, such as the number of events meeting certain criteria, then a summary for a given time period may be the number of events in that period meeting the criteria.

Because the report, whenever it is run, includes older time periods, a summary for an older time period can save the work of having to re-run the query on a time period for which a summary was generated, so only the newer data needs to be accounted for. Summaries of historical time periods may also be accumulated to save the work of re-running the query on each historical time period whenever the report is updated.

A process for generating such a summary or report can begin by periodically repeating a query used to define a report. The repeated query performance may focus on recent events. The summarization engine determines automatically from the query whether generation of updated reports can be accelerated by creating intermediate summaries for past time periods. If it can, then a summarization engine can periodically create a non-overlapping intermediate summary covering new data obtained during a recent, non-overlapping time period and stores the summary in a summary data store.

In parallel to the creation of the summaries, the query engine schedules the periodic updating of the report defined by the query. At each scheduled report update, the query engine determines whether intermediate summaries have been generated covering parts of the time period covered by the current report update. If such summaries exist, then the report is based on the information from the summaries; optionally, if additional data has been received that has not yet been summarized but that is required to generate a complete report, then the query is run on this data and, together with the data from the intermediate summaries, the updated current report is generated. This process repeats each time an updated report is scheduled for creation.

Search and report acceleration methods are described in U.S. Pat. No. 8,589,403, issued on Nov. 19, 2013, and U.S. Pat. No. 8,412,696, issued on Apr. 2, 2011, both of which are hereby incorporated by reference in their entirety for all purposes.

6.0. Example Embodiments

According to an embodiment, a method comprises drawing wedges representative of data values. Each wedge of the wedges is adjacent to at least one other wedge of the wedges. The wedges emanate from a substantially same point. The wedges have filled portions that are based upon the data values. The method further comprises receiving updates to the data values in at least near real-time, and, while receiving the updates, changing the wedges to reflect the updates.

In an embodiment, the wedges are arranged as a semi-circle or other sector of a circle or ellipse. In an embodiment, the wedges are each of a substantially equal arc size. In an embodiment, the sizes of the filled portions are based upon the data values. In an embodiment, the colors of the filled portions are based upon the data values.

In an embodiment, the method further comprises providing threshold manipulation controls adjacent to at least one of the wedges. The threshold manipulation controls indicate threshold values represented by thresholds and threshold colors for the thresholds. The threshold manipulation controls are configured to accept inputs that change one or more of the threshold values and/or threshold colors. The method further comprises comparing the data values to the thresholds, and selecting colors for the filled portions based upon the comparison.

In an embodiment, the method further comprises drawing peak indicators on the wedges. The peak indicators show the highest data values that each wedge has represented over a recent time period.

According to an embodiment, a method comprises identifying current values for a set of data items to be depicted within a data visualization. The method further comprises assigning each data item in the set of data items a different angle relative to a central point within the visualization and an axis extending from the central point. The method further comprises calculating positions within the visualization at which to draw value indicators. Each particular value indicator of the value indicators represents a particular value, of the current values, for a particular data item in the set of data items. Each particular value indicator has a particular position that is a particular distance from the central point. The particular distance is calculated based on the particular value. The particular position is further at a particular angle, of the different angles, that was assigned to the particular data item. The method further comprises instructing a computing device and/or output device to display the visualization, with the value indicators drawn at the calculated positions. The method further comprises repeatedly performing: identifying updates to the current values for the set of data items, calculating new positions for the value indicators based on the updates, and instructing the computing device and/or output device to change the visualization based on the new positions.

In an embodiment, the method further comprises receiving the updates, calculating new positions, and instructing the computing device and/or output device to change the visualization in real-time, as the updates are received. In an embodiment, instructing a computing device and/or output device to display the visualization comprises sending a web page to the computing device.

In an embodiment, each particular value indicator is one of: an icon, arc, line, or wedge. The particular position corresponds to a specified point on the particular value indicator. In an embodiment, each particular value indicator is an arc and the particular position is a mid-point of the arc. In an embodiment, each particular value indicator is a wedge and the particular position is a mid-point of a line or arc at a far end of the wedge.

In an embodiment, the visualization further comprises a semi-circle formed from a circle around the central point, wherein the value indicators are positioned within different sectors of the semi-circle. In an embodiment, the visualization further comprises different sectors corresponding to the different angles, each indicator being an arc or line segment stretching from one side of the corresponding sector to the other side of the corresponding sector. In an embodiment, the different angles are spaced at substantially equal increments.

In an embodiment, the method further comprises, based upon a first value that a first indicator of the value indicators represents, selecting a first color in which to display at least a first portion of a first sector in which the first indicator is positioned. The method further comprises instructing the computing device and/or output device to display at least the first portion in the first color. In an embodiment, wherein the first portion is a first area between the central point and the first indicator. In an embodiment, selecting the first color comprises comparing the first value to one or more thresholds, the one or more thresholds associated with different colors. In an embodiment, the method further comprises instructing the computing device and/or output device to change the first color based upon the updates to the current values.

In an embodiment, the method further comprises instructing the computing device and/or output device to display, in or adjacent to the visualization, one or more interface controls for manipulating the one or more thresholds and the associated different colors. The method further comprises updating the one or more thresholds based upon input received via the one or more interface controls. In an embodiment, the one or more interface controls are depicted along a radius line segment of an elliptical sector in which the indicators are positioned. Each threshold of the one or more thresholds has a threshold indicator that is shown along the radius line segment at a distance from the central point that is calculated based on the threshold. The one or more interface controls enable a user to change the threshold by dragging the threshold indicator to a different distance from the central point along the radius line segment. The one or more interface controls enable a user to add a new threshold by clicking on the radius line segment at a new distance corresponding to a threshold value that the new threshold is to represent.

In an embodiment, the method further comprises tracking the current values for the set of data items over time. A first value indicator at a first position reflects a first value, for a first data item, that is higher than any other value that the first data item has had over a recent period of time. Upon determining to move the first value indicator to a second position to reflect a second value that is lower than the first value, the method further comprises instructing the instructing the computing device and/or output device to display a peak indicator at the first position for a period of time and/or until a time when the first data item has a third value that is higher than the first value.

In an embodiment, the method further comprises receiving, via a graphical interface in which the visualization is shown, input that selects a category and/or group of data items. The method further comprises changing the set of data items shown within the visualization based upon the input.

In an embodiment, the indicators are depicted within a polar coordinate system, wherein the scale of the polar coordinate system changes over time based on a function of the current values.

In other aspects, the invention encompasses a computer apparatus and a computer-readable medium configured to carry out the foregoing steps.

According to an embodiment, a computer-implemented method for rendering data comprises: receiving a selection of a data source group that provides the data from a first data source category; receiving a selection of a metric to be rendered in a radial graph for the data; retrieving the data at a periodic basis to generate the metric in real-time; and rendering data in the radial graph in real-time, wherein a wedge of the radial graph corresponds to the data source group, and wherein the first data source category is visually separated from a second data source category in the radial graph.

In an embodiment, the radial graph comprises at least one threshold setting, wherein the threshold setting is adjustable by a user. In an embodiment, the method further comprises rendering a threshold setting, wherein the threshold setting is configured to receive an input to establish a number of thresholds, to change a level of at least one threshold, increase the number of thresholds, or decrease the number of thresholds. In an embodiment, the method further comprises rendering a threshold modification user interface configured to receive an input to change an appearance of the data rendered in the radial graph. In an embodiment, the method further comprises rendering a peak indicator that indicates a change in position of the data from a first level to a second level. In an embodiment, the data is unstructured data. In an embodiment, the data is stored in a time-series data store.

In an embodiment, a value of the metric comprises a calculation on a data source group. In an embodiment, a value of the metric comprises average CPU usage, average memory usage, and a total amount of memory used. In an embodiment, the method further comprises rendering a data selection user interface comprising a plurality of group selection user interfaces. In an embodiment, the method further comprises rendering a data selection user interface comprising a plurality of group selection user interfaces, wherein a first group selection interface of the plurality of group selection user interfaces is configured to receive an input to select a data source category. In an embodiment, the method further comprises rendering a data selection user interface comprising a plurality of group selection user interfaces, wherein a second group selection interface of the plurality of group selection user interfaces is configured to receive an input to select a data source group for the data source category. In an embodiment, the method further comprises rendering a data selection user interface comprising a plurality of group selection user interfaces, wherein a third group selection interface of the plurality of group selection user interfaces is configured to receive an input to select a data source host.

In an embodiment, the method further comprises rendering a plurality of metric interfaces configured to receive an input to select or de-select a category, a group, or a metric to be rendered in the radial graph. In an embodiment, the method further comprises retrieving the data at a periodic basis to generate the metric in real-time comprises transmitting a search request to query a search engine.

According to an embodiment, a computer-implemented method for rendering data comprises: receiving substantially real-time data; determining at least one metric from the substantially real-time data; and rendering a radial graph comprising at least one indicator rendered in at least one sector of the radial graph. The at least one indicator comprises: an origin at the center of the radial graph, a variable radius, a variable arc having the same arc length as an arc of the at least one sector at the variable radius, wherein the variable radius adjusts to reflect a current value of the at least one metric determined from the substantially real-time data, and wherein the indicator is rendered to fill an area defined by the variable radius and the variable arc.

In an embodiment, the data comprises machine data. In an embodiment, the data comprises unstructured data. In an embodiment, the method further comprises storing the substantially real-time data in a time series data store. In an embodiment, the method further comprises displaying a scale for the at least one metric, and displaying an arc to indicate where a value on the scale for the at least one metric is relative to the variable arc of the at least one indicator. In an embodiment, the method further comprises changing a color of the at least one indicator from a first color associated with the at least one metric below a threshold to a second color associated with the at least one metric at or above the threshold.

In an embodiment, the method further comprises rendering a threshold setting, wherein the threshold setting is configured to receive an input to establish a number of thresholds, to change a level of at least one threshold, increase the number of thresholds, or decrease the number of thresholds. In an embodiment, the method further comprises further comprising rendering a peak indicator that indicates a change in position of the data from a first level to a second level.

In an embodiment, the method further comprises labeling the at least one indicator with at least one group name In an embodiment, the method further comprises rendering a second indicator in a second sector in the radial graph; and visually identifying the at least one indicator and the second indicator as a group of indicator by labeling the at least one indicator and the second indicator as groups of sectors with a category name.

In an embodiment, the method further comprises receiving an input to filter a category from the radial graph, and rendering the radial graph to reflect the input to filter a category from the radial graph. In an embodiment, the method further comprises receiving an input to filter a group from the radial graph, and rendering the radial graph to reflect the input to filter the group from the radial graph.

In an embodiment, the method further comprises receiving an input to change the at least one metric to a second metric, and rendering the radial graph to reflect the input to change the at least one metric to the second metric.

7.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
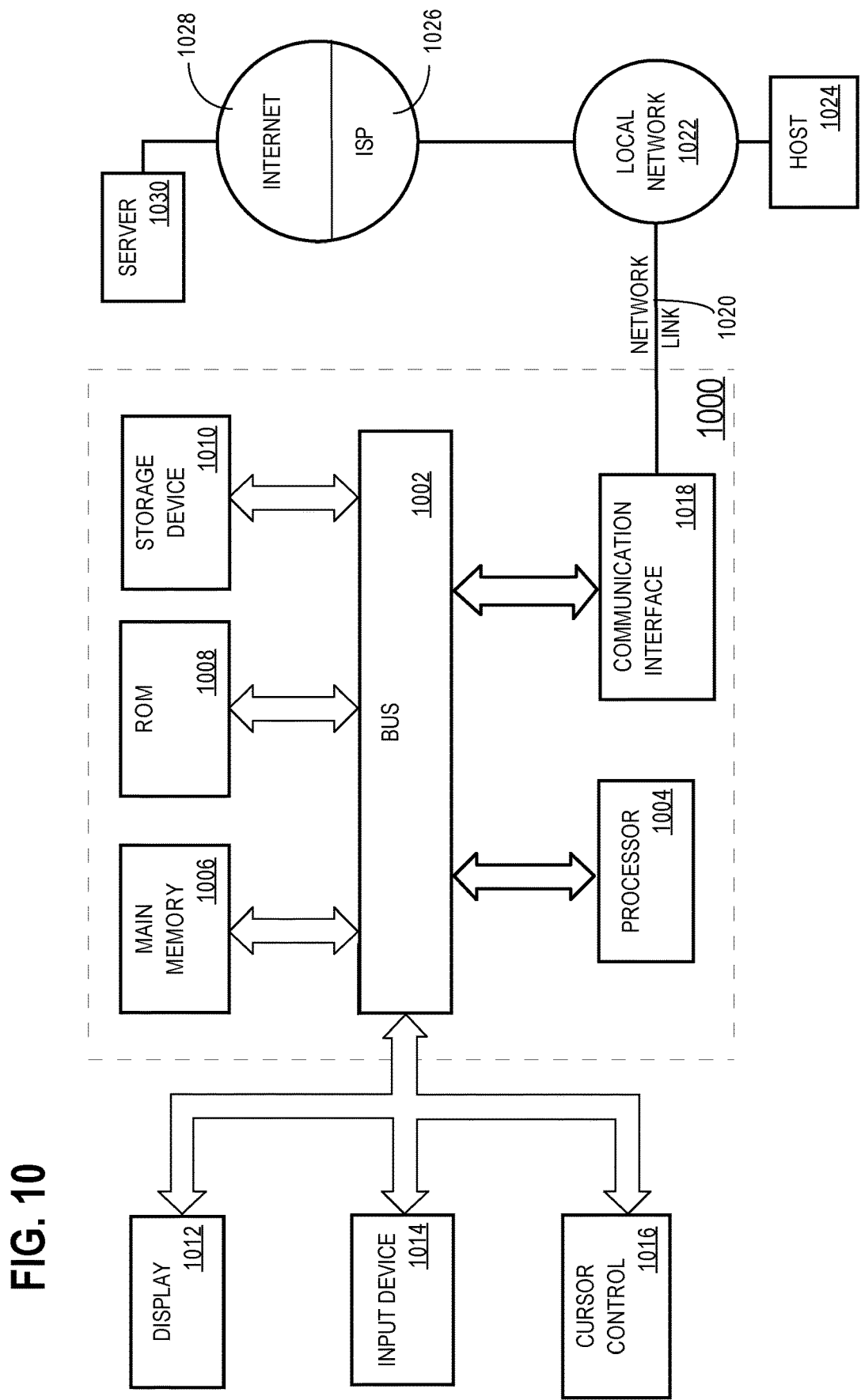
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

8.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving a set of data values from one or more data sources;
   causing display of the set of data values in a radial graph comprising a semi-circular region having sectors with a common vertex, wherein each sector includes a radial projection that fills the sector extending from a first level in the sector to a second level in the sector determined by mapping a corresponding data value in the set of data values to a fixed scale for the graph; and
   upon receiving substantially real-time updates to one or more data values in the set of data values that correspond to a particular radial projection, dynamically modifying the fill of that radial projection within the corresponding sector to a level that reflects the changes in the one or more data values while maintaining the fixed scale for the radial graph.

2. The method of claim 1, wherein a radial projection for a sector comprises a sub-sector having a radius representing the corresponding data value for the radial projection.

3. The method of claim 1, further comprising displaying one or more peak-value indicators for radial projections in the radial graph, wherein a peak-value indicator indicates a peak value represented by a corresponding radial projection during a preceding time interval.

4. The method of claim 1, further comprising:
   displaying one or more peak-value indicators for radial projections in the radial graph; and
   wherein a peak-value indicator for a radial projection comprises a radial arc overlaid on an associated sector at a furthest radial distance reached by the radial projection during a preceding time interval.

5. The method of claim 1, wherein a radial projection is displayed using one or more colors that are selected based on the corresponding data value for the radial projection.

6. The method of claim 1, wherein a radial projection is displayed using one or more patterns that are selected based on the corresponding data value for the radial projection.

7. The method of claim 1, wherein a radial projection is displayed using one or more colors that are selected based on the corresponding data value for the radial projection, and wherein the one or more colors are further selected based on whether the corresponding data value exceeds one or more threshold values.

8. The method of claim 1,
   wherein a radial projection is displayed using one or more colors that are selected based on the corresponding data value for the radial projection;
   wherein the one or more colors are further selected based on whether the corresponding data value exceeds one or more threshold values; and
   wherein displaying the radial graph includes displaying one or more threshold-manipulation controls in proximity to the radial graph, wherein the one or more threshold-manipulation controls enable a user to configure the one or more threshold values.

9. The method of claim 1, wherein displaying the radial graph includes displaying one or more data-selection controls that enable a user to select the set of data values to be displayed by specifying:
   one or more data sources for the set of data values; and
   one or more types of data to display from the one or more data sources.

10. The method of claim 1, wherein a boundary of the semi-circular region is not displayed except to an extent of overlap with sectors or radial projections.

11. The method of claim 1, wherein a boundary of a sector is not displayed except to an extent of overlap with a radial projection.

12. The method of claim 1, wherein an entirety of the semi-circular region is included in the sectors.

13. The method of claim 1, wherein an entirety of the semi-circular region is not included in the sectors.

14. The method of claim 1, wherein each side of each sector is adjacent to another one of the sectors.

15. The method of claim 1, wherein at least one side of one sector is not adjacent to another one of the sectors.

16. One or more non-transitory computer-readable storage media, storing one or more sequences of instructions, which when executed by one or more processors cause performance of:
   receiving a set of data values from one or more data sources;
   causing display of the set of data values in a radial graph comprising a semi-circular region having sectors with a common vertex, wherein each sector includes a radial projection that fills the sector extending from a first level in the sector to a second level in the sector determined by mapping a corresponding data value in the set of data values to a fixed scale for the graph; and
   upon receiving substantially real-time updates to one or more data values in the set of data values that correspond to a particular radial projection, dynamically modifying the fill of that radial projection within the corresponding sector to a level that reflects the changes in the one or more data values while maintaining the fixed scale for the radial graph.

17. The one or more non-transitory computer-readable storage media of claim 16, wherein a radial projection for a sector comprises a sub-sector having a radius representing the corresponding data value for the radial projection.

18. The one or more non-transitory computer-readable storage media of claim 16, where the method further comprises displaying one or more peak-value indicators for radial projections in the radial graph, wherein a peak-value indicator indicates a peak value represented by a corresponding radial projection during a preceding time interval.

19. The one or more non-transitory computer-readable storage media of claim 16, further comprising:
- displaying one or more peak-value indicators for radial projections in the radial graph; and
- wherein a peak-value indicator for a radial projection comprises a radial arc overlaid on an associated sector at a furthest radial distance reached by the radial projection during a preceding time interval.

20. An apparatus, comprising:
- a computing device comprising a processor and a memory, wherein the computing device is configured to:
  - receive a set of data values from one or more data sources;
  - cause display of the set of data values in a radial graph comprising a semi-circular region having sectors with a common vertex, wherein each sector includes a radial projection that fills the sector extending from a first level in the sector to a second level in the sector determined by mapping a corresponding data value in the set of data values to a fixed scale for the graph; and
  - upon receiving substantially real-time updates to one or more data values in the set of data values that correspond to a particular radial projection, dynamically modify the fill of that radial projection within the corresponding sector to a level that reflects the changes in the one or more data values while maintaining the fixed scale for the radial graph.

* * * * *